(12) United States Patent  (10) Patent No.: US 7,766,544 B2
Shibuya et al.  (45) Date of Patent: Aug. 3, 2010

(54) TEMPERATURE SENSOR MOUNTING STRUCTURE AND BATTERY MODULE STRUCTURE

(75) Inventors: Kentaro Shibuya, Shioya-gun (JP);
Naoki Maruno, Utsunomiya (JP);
Atsushi Mizutani, Utsunomiya (JP);
Toshiyuki Matsuoka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 38 days.

(21) Appl. No.: 11/912,449

(22) PCT Filed: Apr. 28, 2006

(86) PCT No.: PCT/JP2006/309056

§ 371 (c)(1),
(2), (4) Date: Oct. 24, 2007

(87) PCT Pub. No.: WO2006/118281

PCT Pub. Date: Nov. 9, 2006

(65) Prior Publication Data

US 2009/0022206 A1  Jan. 22, 2009

(30) Foreign Application Priority Data

Apr. 28, 2005 (JP) ............................ 2005-131858
Jun. 15, 2005 (JP) ............................ 2005-174994

(51) Int. Cl.
*G01K 1/08* (2006.01)
*G01K 1/14* (2006.01)
*G01K 7/00* (2006.01)
*G01K 13/00* (2006.01)

(52) U.S. Cl. ...................... 374/152; 374/208; 374/163; 374/141; 320/150

(58) Field of Classification Search ................. 374/163, 374/208, 141, 152
See application file for complete search history.

(56) References Cited

U.S. PATENT DOCUMENTS

| | | | | |
|---|---|---|---|---|
| 5,585,710 A | * | 12/1996 | Nakamura et al. | 320/112 |
| 5,592,065 A | * | 1/1997 | Oglesbee et al. | 320/113 |
| 6,111,387 A | | 8/2000 | Kouzu et al. | |
| 6,211,646 B1 | * | 4/2001 | Kouzu et al. | 320/107 |

(Continued)

FOREIGN PATENT DOCUMENTS

CN  1295950 A  5/2001

(Continued)

OTHER PUBLICATIONS

International Search Report of PCT/JP2006/309056, date of mailing Aug. 8, 2006.

(Continued)

*Primary Examiner*—Lisa M Caputo
*Assistant Examiner*—Mirellys Jagan
(74) *Attorney, Agent, or Firm*—Westerman, Hattori, Daniels & Adrian, LLP

(57) ABSTRACT

A temperature sensor mounting structure for a battery module that is formed by connecting single cells together in series including: a temperature-measuring device that detects the temperature of the battery module; a covering device that covers the temperature-measuring device; and movement-restricting devices that are removably engaged with the battery module and restrict the movement of the covering device.

12 Claims, 18 Drawing Sheets

U.S. PATENT DOCUMENTS

| | | | |
|---|---|---|---|
| 6,379,837 B1* | 4/2002 | Takahashi et al. | 429/151 |
| 6,508,584 B2* | 1/2003 | Blankenagel | 374/1 |
| 6,610,439 B1* | 8/2003 | Kimoto et al. | 429/90 |
| 7,021,823 B2* | 4/2006 | Roepke et al. | 374/152 |
| 7,155,075 B2* | 12/2006 | Rajendran et al. | 385/12 |
| 7,427,156 B2* | 9/2008 | Ambrosio et al. | 374/20 |
| 7,438,988 B2* | 10/2008 | Misu et al. | 429/98 |
| 7,455,610 B2* | 11/2008 | Kim | 475/5 |
| 2002/0043959 A1* | 4/2002 | Tanaka et al. | 320/116 |
| 2003/0082439 A1* | 5/2003 | Sakakibara | 429/120 |
| 2003/0193313 A1* | 10/2003 | Takedomi et al. | 320/107 |
| 2004/0004461 A1* | 1/2004 | Hamada et al. | 320/112 |
| 2005/0231169 A1* | 10/2005 | Seo et al. | 320/150 |
| 2006/0028183 A1* | 2/2006 | Izawa et al. | 320/150 |
| 2006/0043926 A1* | 3/2006 | Nakasho et al. | 320/107 |
| 2006/0103346 A1* | 5/2006 | Misu et al. | 320/107 |
| 2007/0210752 A1* | 9/2007 | Yoon | 320/116 |
| 2008/0003491 A1* | 1/2008 | Yahnker et al. | 429/62 |
| 2009/0041082 A1* | 2/2009 | Paramasivam et al. | 374/152 |
| 2009/0117452 A1* | 5/2009 | Wiesner et al. | 429/90 |
| 2009/0120620 A1* | 5/2009 | Abe et al. | 165/104.31 |
| 2009/0130545 A1* | 5/2009 | Wood et al. | 429/90 |
| 2010/0067562 A1* | 3/2010 | Wakabayashi | 374/208 |

FOREIGN PATENT DOCUMENTS

| | | |
|---|---|---|
| JP | 6-84678 U | 12/1994 |
| JP | 7-38831 Y2 | 9/1995 |
| JP | 8-128901 A | 5/1996 |
| JP | 10-70842 A | 3/1998 |
| JP | 10-239169 A | 9/1998 |
| JP | 2000-48866 A | 2/2000 |
| JP | 2000-223098 A | 8/2000 |
| JP | 2000-340195 A | 8/2000 |
| JP | 2001-266825 A | 9/2001 |
| JP | 2001-345082 A | 12/2001 |
| JP | 2002-157984 A | 5/2002 |
| JP | 2003-187772 A | 4/2003 |
| JP | 3634657 B2 | 3/2005 |

OTHER PUBLICATIONS

Chinese Office Action dated Mar. 6, 2009, issued in corresponding Chinese Patent Application No. 200680013808.7.

Office Action issued on Aug. 4, 2009 in the counterpart Japanese Patent Application No. 2005-174994.

* cited by examiner

TEMPERATURE SENSOR MOUNTING STRUCTURE AND BATTERY MODULE STRUCTURE

TECHNICAL FIELD

The present invention relates to a temperature sensor mounting structure in a battery module, and to a structure for this battery module.

Priority is claimed on Japanese Patent Application Nos. 2005-131858, filed Apr. 28, 2005 and 2005-174994, filed Jun. 15, 2005, the contents of which are incorporated herein by reference.

BACKGROUND OF THE INVENTION

Conventionally, when a temperature sensor is firmly fixed to an object whose temperature is to be measured (hereinafter, "temperature measurement object"), the temperature sensor is mounted on the temperature measurement object using an adhesive agent (see, for example, Patent document 1).

In contrast, when mounting a harness for a temperature sensor on a battery module that is used in a hybrid vehicle, in some cases grooves that are used to contain wiring for harnesses are provided in a side cover of a case that houses a plurality of battery modules (see, for example, Patent document 2).

[Patent Document 1] Japanese Examined Utility Model Application, Second Publication No. H07-38831

[Patent document 2] Japanese Unexamined Patent Application, First Publication No. 2001-266825

SUMMARY OF THE INVENTION

In the former conventional structure described above, care needs to be taken when a temperature sensor is mounted on a temperature measurement object over a number of points such as the positioning of the temperature sensor and the controlling of the coating quantity of adhesive agent and the like. Moreover, maintenance such as replacing temperature sensors cannot be performed easily.

When a temperature sensor is firmly fixed to a battery module used in a hybrid vehicle or the like, in some cases where tape or a heat shrinkable tube is used, such structures may have a difficulty in ensuring accurate positioning of the temperature sensor, and in ensuring accurate temperature measurement as the temperature sensor can easily be affected by battery cooling air.

Moreover, in the latter conventional structure described above, because a harness and the like are wired using grooves in a side cover that extends across a plurality of battery modules, it is easy for the wiring path to become too complex, and replacement of battery module units is difficult. This leads to a deterioration in the workability when attaching or removing the harness.

Therefore, the present invention provides a temperature sensor mounting structure that makes it possible to easily and accurately position a temperature sensor relative to a battery module and that also makes it possible to improve the temperature measurement accuracy, and provides a battery module structure that improves the workability when installing or removing a harness and the like.

As a means for solving the above described problems, the present invention provides a temperature sensor mounting structure for a battery module that is formed by connecting single cells together in series including: a temperature-measuring device that detects the temperature of the battery module; a covering device that covers the temperature-measuring device; and movement-restricting devices that are removably engaged with the battery module in order to restrict the movement of the covering device.

In this temperature sensor mounting structure, it is also possible for the movement-restricting device to be provided with a first movement-restricting device that restricts movement of the covering device in a battery axial direction, and with a second movement-restricting device that restricts movement of the covering device in a rotation direction around the battery axis.

According to the structure, compared with when an adhesive agent or tape or a heat shrinkable tube is used to affix the temperature-measuring device to the battery module, the positioning of the temperature-measuring device on the battery module can be performed easily and accurately via the covering device.

Moreover, as a result of the temperature-measuring device being covered by the covering device, any effects from battery cooling air are suppressed and the temperature measurement accuracy can be improved.

Furthermore, when carrying out maintenance such as replacing the temperature-measuring device, this can also be performed easily.

In this temperature sensor mounting structure, it is also possible for the battery module to be formed by connecting together in series a plurality single cells which are then reversed on themselves to form a U-shape, or by joining together in series a plurality of single cells in a rod shape.

In this temperature sensor mounting structure, it is also possible for the covering device to be mounted on the battery module using a clip connector or a band connector.

According to this structure, when the covering device is connected using the clip connector, it can be easily mounted on the battery module, while when the covering device is connected using the band connector, it can be shared between battery modules having different diameters.

In this temperature sensor mounting structure, it is also possible for a sensor protection device to be provided on an interior side of the covering device.

According to this structure, improved protection is provided for the temperature measurement device by the sensor protection device, and the temperature measurement device is pushed via the sensor protection device towards the battery module side and is firmly fixed thereto, thereby improving the temperature measurement accuracy.

In this temperature sensor mounting structure, it is also possible for the covering device to have an opening to allow air to pass between the interior and exterior thereof.

According to this structure, because air can be circulated inside and outside the covering device while battery cooling air is prevented from directly blowing against the temperature measurement device, not only is the temperature measurement accuracy improved, but temperature increases inside the covering device are suppressed and an excellent battery cooling performance is ensured.

In this temperature sensor mounting structure, it is also possible for the first movement-restricting device to be constructed using protruding and recessed portions of the battery module.

In this temperature sensor mounting structure, it is also possible for the movement-restricting device to be constructed using structural components of the battery module, or using another battery module that is adjacent to this battery module.

According to this structure, the structure of the movement-restricting devices is simplified and a reduction in size and weight can be achieved.

Furthermore, the present invention provides a battery module structure that is formed by joining together single cells, wherein a harness that is mounted on the battery module is fixed to a harness-fixing device that is provided on an endplate of the battery module.

According to this structure, as a result of the harness being fixed in each battery module, the wiring thereof is not complicated, and the wiring operation is easily performed even from the battery module end side. Moreover, replacement can also be performed in battery module units.

In this battery module structure, it is also possible for the harness-fixing device to be constructed using a protruding portion of the endplate.

According to this structure, the structure of the harness-fixing device can be simplified, and a reduction in the cost of the battery modules can be achieved.

In this battery module structure, it is also possible for the protruding portion to be provided on at least one of an inner side and an outer side in the battery longitudinal direction of the endplate.

According to this structure, when the protruding portion is provided on the inner side in the longitudinal direction of the endplates, portions of the harness that are held by the protruding portion do not face the battery module end, and it is not necessary to pay such close attention to ensure that the harness does not become caught up and the like so that there is an improvement in workability when laying the harness.

In contrast, when the protruding portion are provided on the outer side in the longitudinal direction of the endplates, the task of wiring the harness from the battery module end side becomes easier, and it is possible to improve the workability of attaching and removing the harness.

In this battery module structure, it is also possible for the battery module is formed by arranging rod-shaped batteries in parallel rows, and the harness-fixing device has a first fixing device that is positioned between batteries, and a second fixing device that is placed so as to follow an outer circumference of the batteries.

According to this structure, firstly, the harness is held by the first fixing device and is fixed between the batteries, and thereafter this harness can be laid along the outer circumference of the battery and guided to a desired position while it is being held by the second fixing device.

In this battery module structure, it is also possible for the harness to be guided to the outside via a plurality of harness-fixing devices of the endplate.

According to this structure, when, for example, a plurality of battery modules are assembled together, even if the harness that is mounted on the battery module that is positioned on the center side of the plurality of battery modules is guided to the exterior, it is still possible after the harness is wired via the harness-fixing devices of a plurality of endplates to guide it to a desired position.

According to the present invention, it is possible to easily and accurately position a temperature-measuring device relative to a battery module which is formed by joining together in series a plurality of single cells, and also improve the temperature measurement accuracy. Moreover, maintenance of the temperature measurement device can be easily performed and a simplification of the movement restricting structure thereof can be achieved.

According to the present invention, a covering device can be easily mounted on a battery module, or it can be shared between battery modules having different diameters.

According to the present invention, improved protection can be provided for the temperature-measuring device and the temperature measurement accuracy can be improved.

According to the present invention, not only is the temperature measurement accuracy improved, but also an excellent battery cooling performance is ensured.

According to the present invention, the structure of the movement-restricting device is simplified and a reduction in both size and weight can be achieved.

According to the present invention, it is possible to improve the workability of attaching and removing a harness, and it is possible to prevent the harness from becoming caught up when a plurality of battery modules are being assembled. In addition, maintenance can also be easily performed in battery module units.

According to the present invention, the structure of the harness-fixing device is simplified and a reduction in the cost of the battery modules is achieved.

According to the present invention, it is possible to improve workability when laying out a battery module, and the workability when a harness is connected or disconnected is improved.

According to the present invention, the wiring of a harness can be laid reliably and freely.

According to the present invention, the shape of the harness can be properly organized and the wire connection workability can be improved.

DETAILED DESCRIPTION OF THE INVENTION

Figure 1:
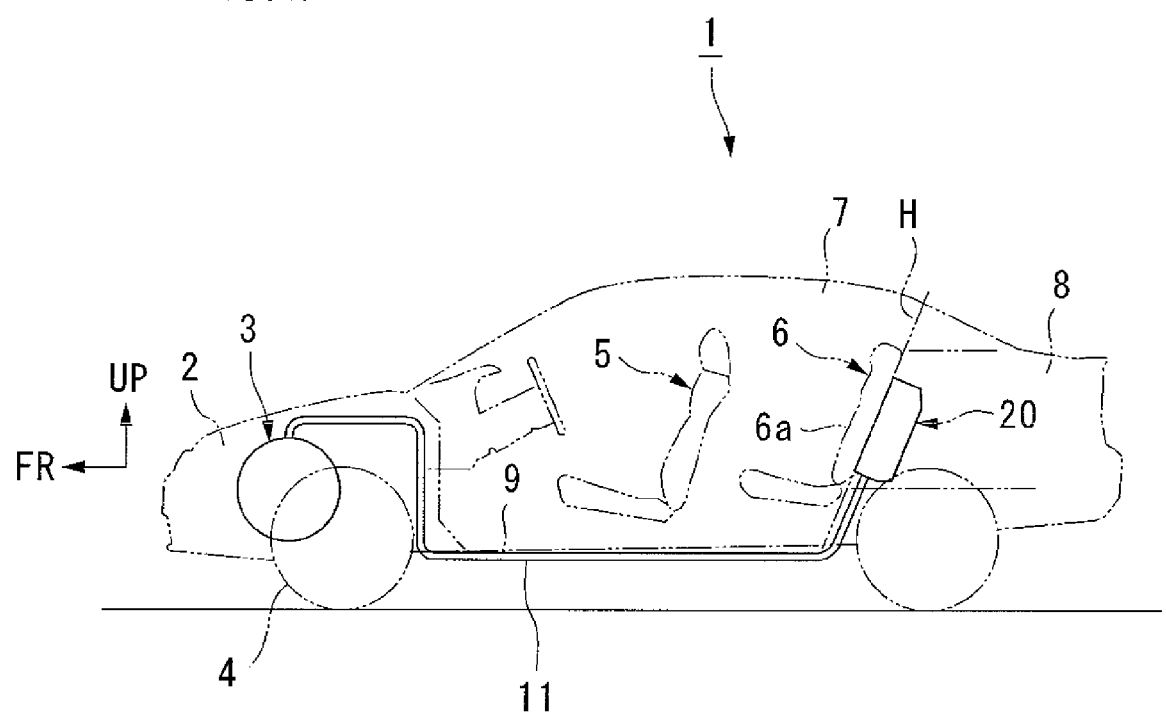
FIG. 1 is a schematic side view showing a hybrid vehicle in an embodiment of the present invention.

Embodiments of the present invention will now be described with reference made to the drawings. Note that orientations such as front-back and left-right in the description below are the same as normal orientations in a vehicle unless specifically stated otherwise. In addition, the arrow FR in the drawings indicates the front of a vehicle, the arrow LH indicates the left of a vehicle, and the arrow UP indicates the top of a vehicle.

First Embodiment

A vehicle 1 shown in FIG. 1 is a hybrid vehicle. Auxiliary driving is provided to an internal combustion engine by a motor generator, and when the vehicle decelerates and the like, kinetic energy can be recovered by the motor generator as electrical energy. Recovered electrical energy is used to charge an energy storage apparatus via a power converter.

A power unit 3 that is formed by arranging the engine and motor generator in series is mounted in an engine room 2 in a front portion of a vehicle body of the vehicle 1. Drive power from the power unit 3 is transmitted to front wheels 4. A compartment 7 that has a front seat 5 and a back seat 6 is provided to the rear of the engine room 2, while a trunk room 8 that is partitioned off from the compartment 7 by a seat back 6a and the like of the back seat 6 is provided to the rear of the compartment 7. A high-voltage electrical equipment box 20 that is connected to the power unit 3 via a power cable 11 below a floor 9 is placed to the rear of the seat back 6a of the back seat 6 (i.e., within the trunk room 8).

Figure 2:
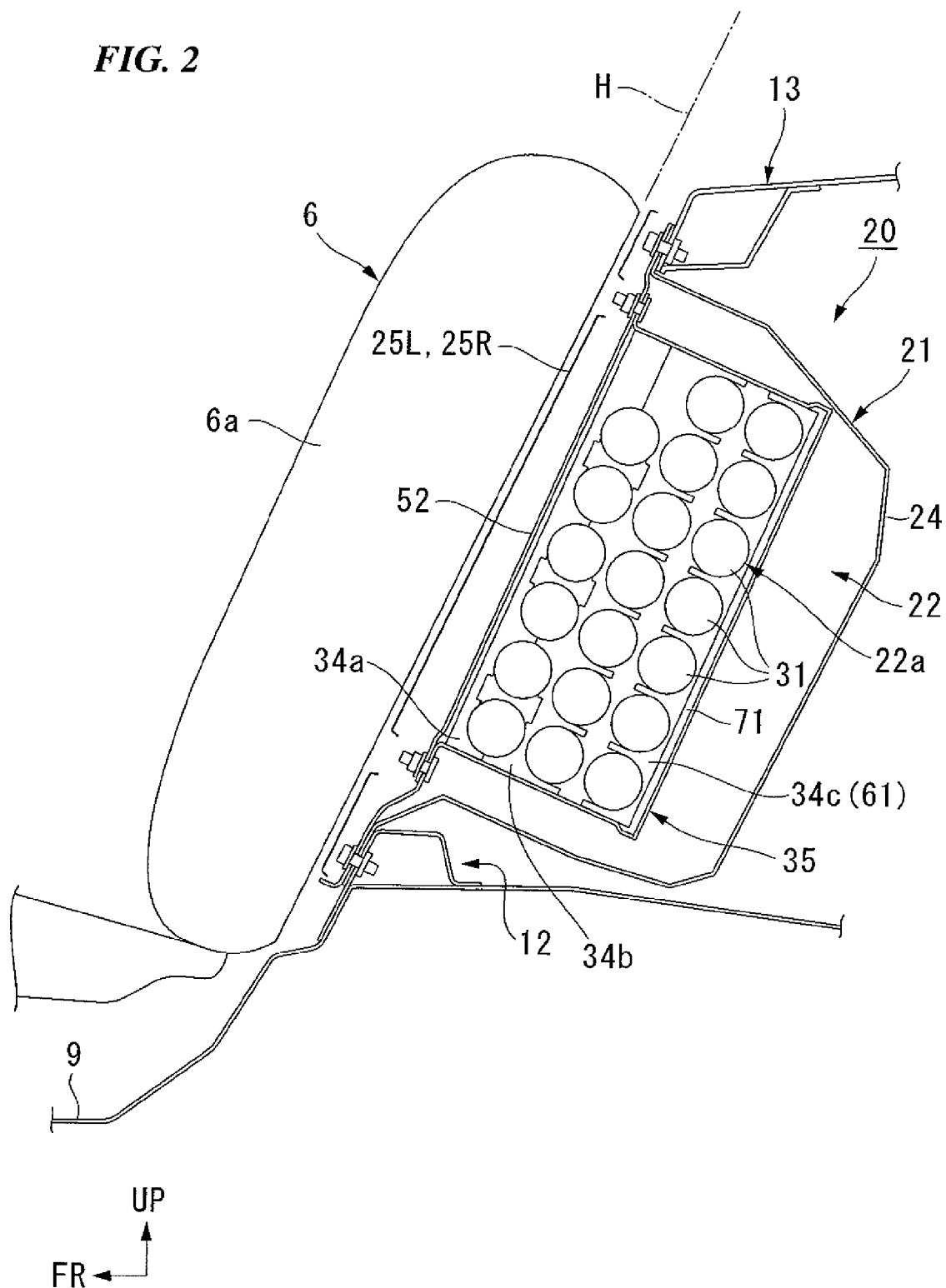
FIG. 2 is a side view showing the vicinity of a high-voltage electrical equipment box that is mounted in the vehicle.
Figure 3:
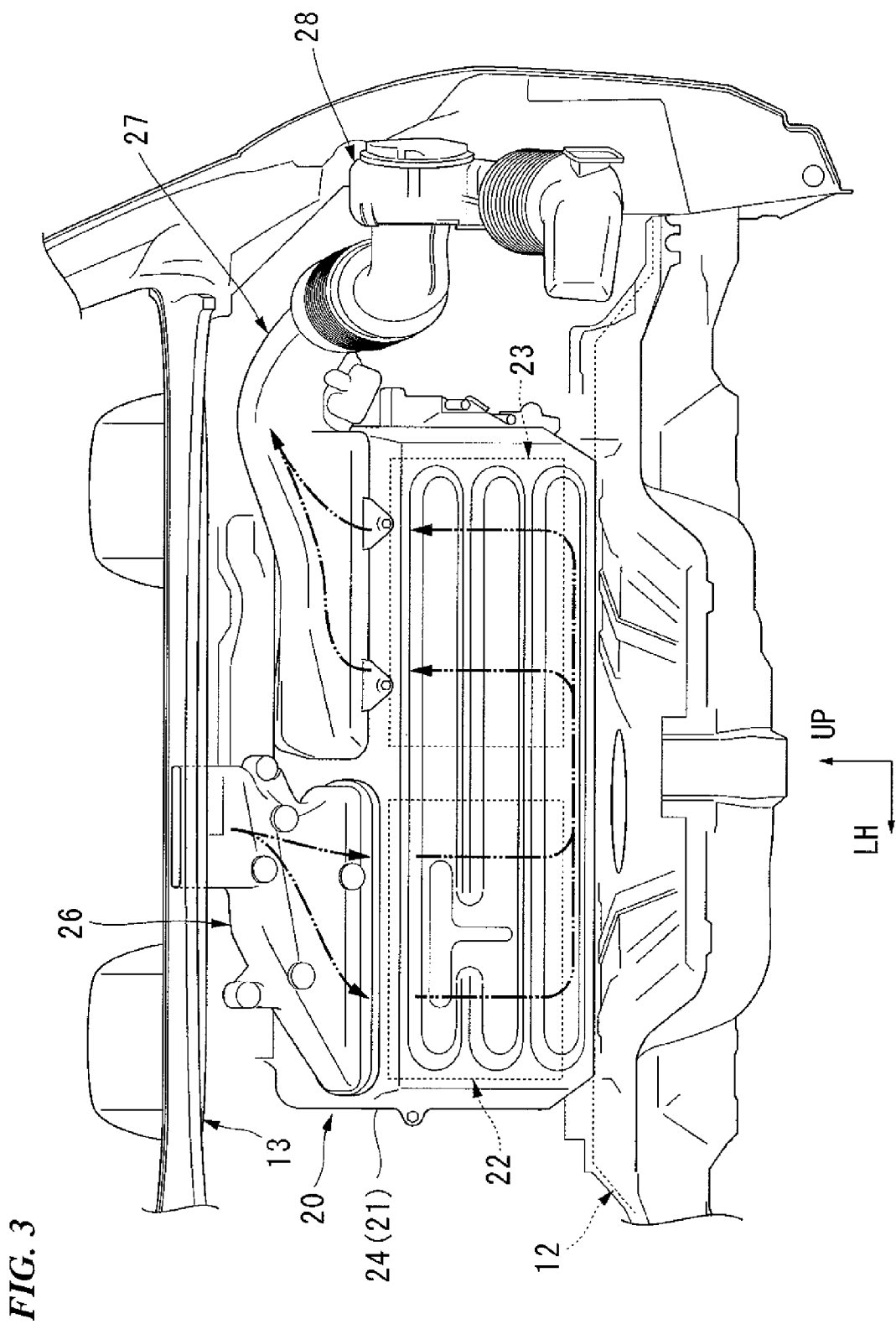
FIG. 3 is a rear view showing the high-voltage electrical equipment box.

As is shown in FIG. 2 and FIG. 3, the high-voltage electrical equipment box 20 houses inside a box-shaped exterior case 21 electrical equipment such as a battery box 22 that makes up a high-voltage battery 22a which serve as the energy storage, and an inverter unit 23 which serves as the power converter.

The exterior case 21 is formed by a box-shaped case body 24 that opens onto the seat back 6a side, and a left cover 25L and right cover 25R that block off respectively a left side and right side of the opening of the case body 24. The battery box 22 is provided on the left side inside the exterior case 21, while the inverter unit 23 is housed on the right side inside the exterior case 21.

The seat back 6a of the back seat 6 is sloped so as to be located closer to the rear the higher up the seat back. The high-voltage electrical equipment box 20 is positioned so as to follow the slope of a rear surface H of the seat back 6a. The seat back 6a and the high-voltage electrical equipment box 20 are supported by bottom portions thereof being fixed to a rear cross member 12 which serves as a vehicle frame component, and by top portions thereof being fixed to a rear parcel 13 which also serves as a vehicle frame component.

An intake duct 26 that makes it possible for air from inside the compartment 7 to be introduced into the high-voltage electrical equipment box 20 in order to cool electrical equipment such as the high-voltage battery 22a and the inverter unit 23 that are located within the battery box 22 is provided on the left side upper portion of the high-voltage electrical equipment box 20, while an exhaust duct 27 that makes it possible to discharge the air after the electrical equipment is cooled is provided on the right side upper portion of the high-voltage electrical equipment box 20. A cooling fan 28 that is used to circulate air inside the intake duct 26, the high-voltage electrical equipment box 20, and the exhaust duct 27 is provided at an intermediate portion of the exhaust duct 27.

Air that is introduced into the high-voltage electrical equipment box 20 from the intake duct 26 flows downwards while cooling the high-voltage battery 22a within the battery box 22 on the left side of the high-voltage battery box 20. After this air then moved to the right side at the bottom end portion of the high-voltage battery box 20, it flows upwards while cooling the inverter unit 23. Thereafter, this air is guided to the outside of the high-voltage electrical equipment box 20 via the exhaust duct 27, and is discharged into the trunk room 8 or to the outside of the vehicle. Note that the flow of the air at this time is indicated by the chain line arrows in FIG. 3.

Figure 4:
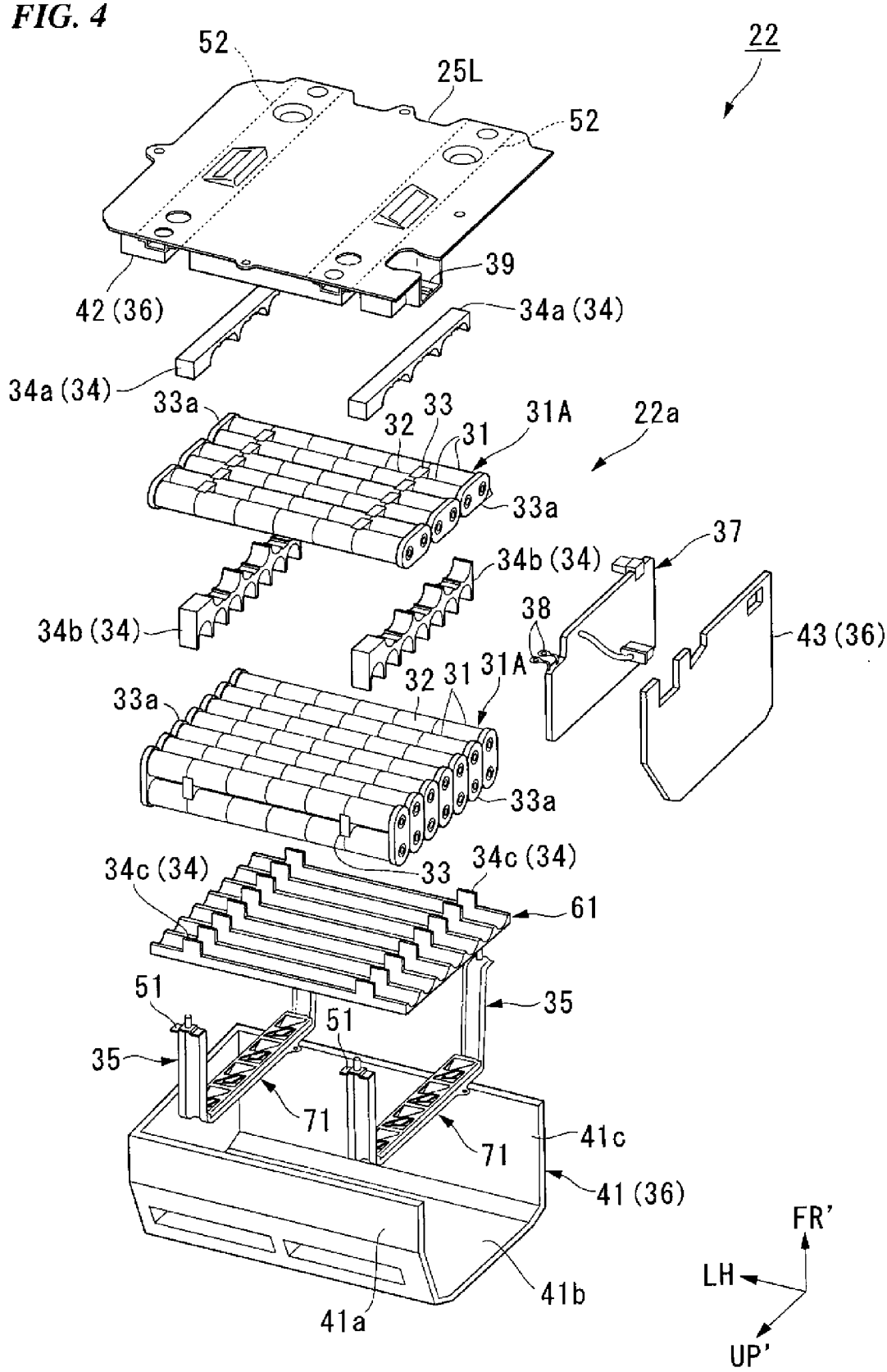
FIG. 4 is an exploded perspective view showing a battery box of the high-voltage electrical equipment box.

FIG. 4 is an exploded perspective view showing the battery box 22. As is shown in FIG. 4, a plurality of bar-shaped batteries 31 are held as integrated units by pairs of left and right holders 34 and holding frames 35, and these are housed in an insulator 36 which is made from foam non-conductive resin. Note that the arrow UP' in the drawing indicates an upward direction following the slope of the rear surface H (i.e., a direction following the slope of the high-voltage electrical equipment box 20), while the arrow FR' indicates a forward direction at right angles to the rear surface H (i.e., the thickness direction of the high-voltage electrical equipment box 20).

Each battery 31 is formed by electrically and mechanically connecting in series a plurality of (i.e., six) circular column-shaped single cells 32. In the present embodiment, the two end portions of a pair of batteries 31 which are arranged next to each other so as to have alternate positive and negative poles are connected together via endplates 33a, and one of these end portions is connected each other. As a result, the pair of batteries 31 is treated as an integrated battery module 31A. A pair of spacers (i.e., structural components) 33 which are formed from a non-conductive resin such as nylon are placed between the two batteries 31 of the battery module 31A. Note that the battery modules 31A are formed by connecting together in series a total of 12 single cells 32 so that they are reversed on themselves to form a U-shape, however, it is also possible to use a structure in which a battery module is formed by joining together in series six single cells 32 in a rod-shape, namely, a structure in which a battery module is formed by a single battery 31.

Each battery module 31A is arranged with the longitudinal direction (i.e., the axial direction) thereof aligned in the left-right direction, and with the end portions thereof on the side that is connected facing to the left side. At this time, the battery module 31A that is placed on the left cover 25L side (i.e., the side of the opening in the exterior case 21) is arranged such that the respective batteries 31 are lined up along the slope of the high-voltage electrical equipment box 20, and the battery module 31A that is placed on the bottom wall side of the exterior case 21 is arranged such that the respective batteries 31 are lined up in the thickness direction of the high-voltage electrical equipment box 20 (see FIG. 2).

In addition, as a result of the end portion on the right side of each battery module 31A (i.e., the end portion on the non-wired side) being suitably wired using a bus bar plate 37, all of the batteries 31 are connected in series thereby constructing the high-voltage battery 22a. Output and input terminals 38 on the positive pole side and negative pole side of the high-voltage battery 22a lead out from the bus bar plate 37, and the respective output and input terminals 38 are wired to the inverter unit 23 and the like via an output and input terminal block 39 which is provided on the left cover 25L.

Each holder 34 is formed from a non-conductive resin such as nylon and, in the thickness direction of the high-voltage electrical equipment box 20, is separated in this order from the opening side of the exterior case 21 into an upper holder 34*a*, a middle holder 34*b*, and a lower holder 34*c*. Of these, the battery modules 31A which are constructed from three batteries 31 and placed on the opening side of the exterior case 21 are gripped and held by the upper holder 34*a* and the middle holder 34*b*, while the battery modules 31A which are constructed from seven batteries 31 and placed on the bottom wall side of the exterior case 21 are gripped and held by the middle holder 34*b* and the lower holder 34*c*.

Each lower holder 34*c* is formed integrally with a separator 61 which is also formed from a non-conductive resin such as nylon. The separator 61 is formed in a plate shape and is provided so as to extend along a bottom wall portion 41*b* of an insulator body 41. The internal space inside the insulator 36 is partitioned by the separator 61 into a battery placement space and a cooling air inlet path near the bottom wall portion 41*b*.

Each holder 34 is placed so as to be in the same position in the left-right direction as the battery spacers 33 of the respective battery modules 31A, and they are suitably engaged respectively with side end portions of each spacer 33. In addition, as a result of circular protrusions 53 which are formed on an outer circumference of the batteries 31 being engaged in circular grooves 54 which are formed on an inner circumference of the holder 34, the respective battery modules 31A are positioned in the left-right direction and the like (see FIG. 5).

The insulator 36 is formed as a lining for the exterior case 21, and a portion that corresponds to the opening of the exterior case 21 is formed separately from the insulator body 41 as an insulator upper 42, and a side wall portion on the inverter unit 23 side (i.e., the right side) is also formed separately as an insulator side 43. Note that the insulator upper 42 is attached to the left cover 25L and is treated as being integral therewith.

When viewed from a side surface, each holding frame 35 forms a U-shape that extends along an inner side of the insulator body 41 across a top wall portion 41*a*, the bottom wall portion 41*b*, and a lower wall portion 41*c* thereof. Facing portions 51 that are bent towards the outer side of the insulator 36 so as to be substantially parallel with the left cover 25L are provided at both end portions of each holding frame 35.

A pair of base frames 52 that correspond to the respective holding frames 35 are attached to the left cover 25L, and the two facing portions 51 of the holding frames 35 are fastened respectively to the two end portions of the base frames 52. Each holding frame 35 and base frame 52 is placed in the same position as the respective holders 34 in the left-right direction so that, when these are fastened together, each battery module 31A is held integrally with the respective holders 34. Note that the symbol 71 in the drawings shows spring members that are placed above a base portion of each holding frame 35 and applies urging force to each battery module 31A.

Figure 5:
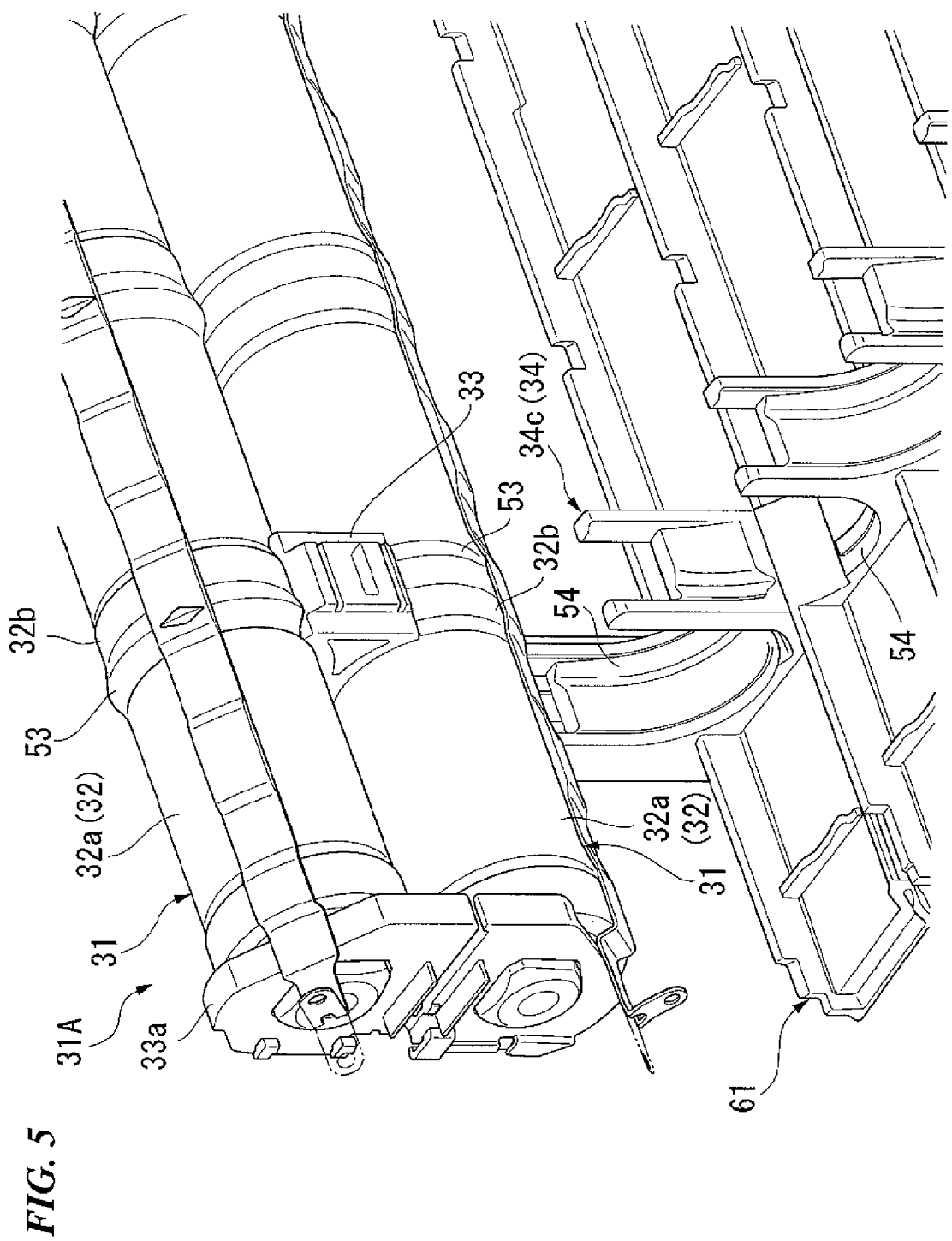
FIG. 5 is a perspective view showing a holding portion of a battery module of the high-voltage electrical equipment box.

As is shown in FIG. 5, the single cells 32 that make up the batteries 31 have an outer circumference that is formed by metal outer tubes (i.e., structural components) 32*a*. Cylindrical skirt portions 32*b* that enable, for example, the positive pole side end portion of one single cell 32 to fit together with the negative pole side end portion of another single cell 32 are provided in connection portions between each single cell 32. When the other single cell 32 is fitted into the skirt portion 32*b*, by then joining the outer tube 32*a* of this other single cell 32 to the skirt portion 32*b* by soldering or the like, the respective single cells 32 are mechanically connected. Note that the outer circumferences of the batteries 31 are covered by a non-conductive film.

Here, the circular protrusions 53 are formed on an outer circumference of a base end portion of each skirt portion 32*b* that is located on the outer tube 32*a* of each single cell 32. Namely, the circular protrusions 53 are provided, for example, at the negative pole side end portion of each single cell 32, and when viewed in connecting portion units of each single cell 32, the circular protrusions 53 are offset, for example, towards the positive pole side.

Each battery 31 is held by the respective holders 34 at the connecting portions between the single cells 32 that are located at the two end portions of the battery 31 and the single cells 32 located on the inner side thereof. The circular grooves 54 that match the shape of the circular protrusions 53 are formed in matching portions of each holder 34 where the holders 34 match the shape of the outer circumference of the battery 31. These circular grooves 54 are offset, for example, towards the positive pole side in the connecting portions in the same way as the circular protrusions 53.

By assembling the respective batteries 31 in the holders 34 such that the circular grooves 54 are matched with the circular protrusions 53, it is possible to prevent erroneous assembly in which the positive and negative poles of the respective batteries 31 are reversed, and movement in the longitudinal direction (i.e., the axial direction) of each battery 31 as well as in directions orthogonal to this direction is restricted.

Figure 6:
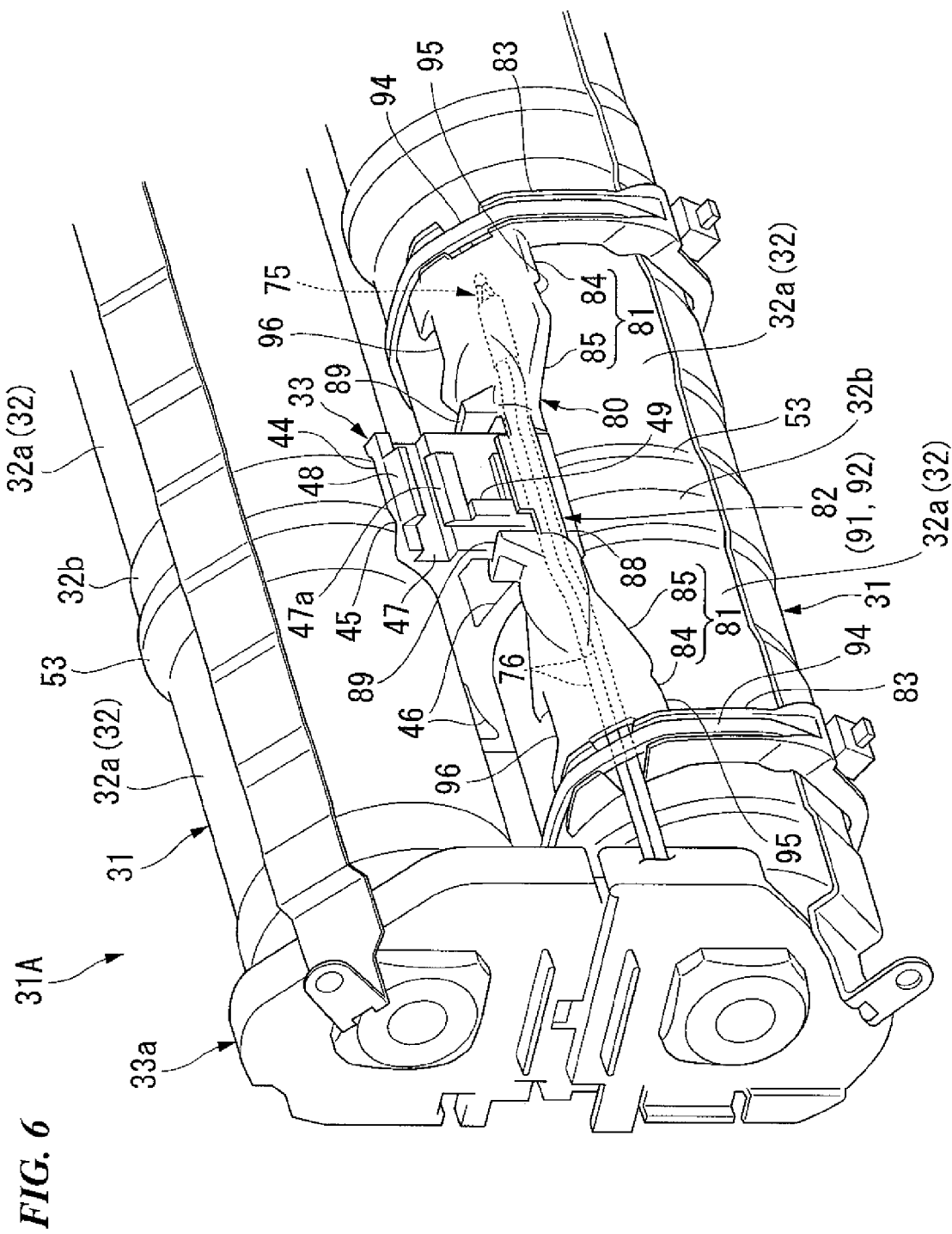
FIG. 6 is a perspective view showing a temperature sensor mounting portion of the battery module.
Figure 7:
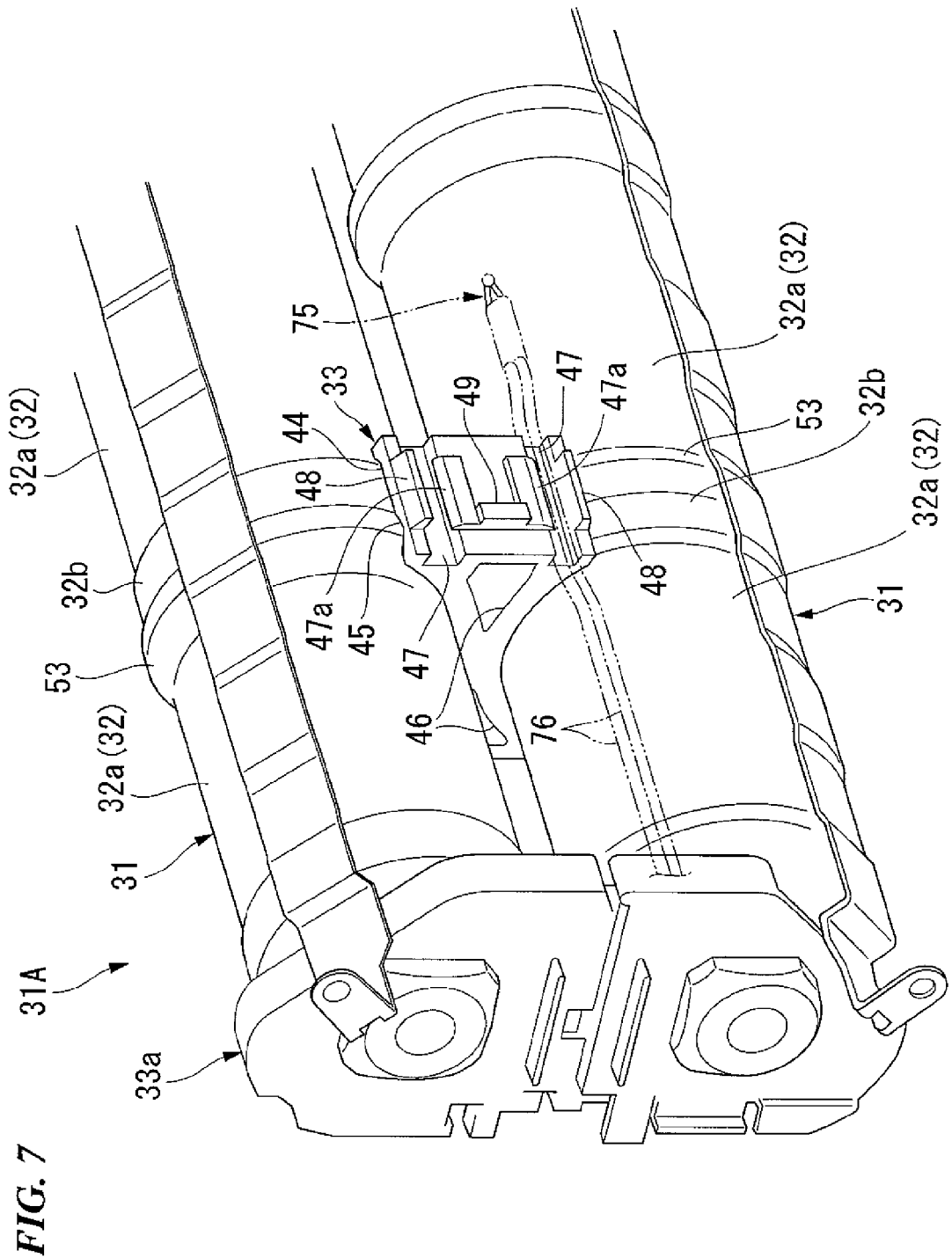
FIG. 7 is a perspective view in which a sensor cover is removed from the temperature sensor mounting portion.

FIG. 6 and FIG. 7 show one side portion of the battery module 31A on which a temperature sensor (i.e., a temperature measurement device) 75 (described below in detail) is mounted. Hereinafter, the alignment direction of the two batteries 31 in the battery module 31A is called the vertical direction, while a direction that is perpendicular to this vertical direction and to the axial direction (i.e., the longitudinal direction) of the batteries 31 is called the horizontal direction.

In a side portion of the battery module 31A, the spacer 33 is sandwiched by the two batteries 31 in the connecting portion between the single cell 32 that is positioned at the battery end and the single cell 32 that is positioned on the inner side in the axial direction thereof. Matching portions 44 which are shaped like a circular arc when viewed from the axial direction that match the shape of the outer circumference of the respective batteries 31, and groove portions 45 that are formed on the matching portions 44 and match the shape of the circular protrusion 53 of the respective batteries 31 are provided at both sides in the vertical direction of this spacer 33.

Each matching portion 44 is provided so as to extend in the horizontal direction across positions of the two round bar-shaped batteries 31 that are immediately adjacent thereto when viewed from the axial direction. Accordingly, the spacers 33 are provided such that the thickness thereof in the vertical direction increases towards the outer side in the horizontal direction. As a result, by matching the respective matching portions 44 to the battery outer circumference (i.e., the outer tubes 32*a* of the single cells 32), movement of the spacers 33 in the circumferential direction of the batteries 31 (i.e., in a rotation direction around an axis) is restricted, and by matching the respective groove portions 45 to the circular protrusions 53, movement of the spacers 33 in the battery axial direction is restricted.

A hollowed out hole 46 which has a triangular configuration when viewed from the axial direction and that penetrates the spacer 33 while leaving an outer wall of a predetermined thickness is provided on both sides in the horizontal direction of each spacer 33. The width in the horizontal direction of the spacers 33 is substantially the same as the battery diameter, and end portions on both sides thereof are provided so as to be substantially parallel with the vertical direction and the battery axial direction.

In addition, the temperature sensor 75 is mounted on an outer circumference of the second single cell 32 from an end of one battery 31. This temperature sensor 75 detects the temperature of this single cell 32 as the temperature of the battery module 31A and, consequently, as the temperature of the high-voltage battery 22A.

This temperature sensor 75 is, for example, a thermistor, and is mounted on an inner side of the outer side end in the horizontal direction of the battery module 31A so as to be tightly adhered to the battery outer circumference. Wires 76 that supply electricity to the temperature sensor 75 extend in the axial direction from the battery end along the outer circumference thereof and are connected to the temperature sensor 75.

Wire placement grooves 47 that extend in the battery axial direction are provided on both sides in the vertical direction of side end portions of the spacers 33. Of these wire placement grooves 47, the wires 76 of the temperature sensor 75 are made to pass through the wire placement groove 47 that is located on the side where the temperature sensor 75 is provided.

This temperature sensor 75 and the wires 76 that are adjacent thereto are covered and held by a sensor cover 80 that is formed from non-conductive resin.

Figure 8:
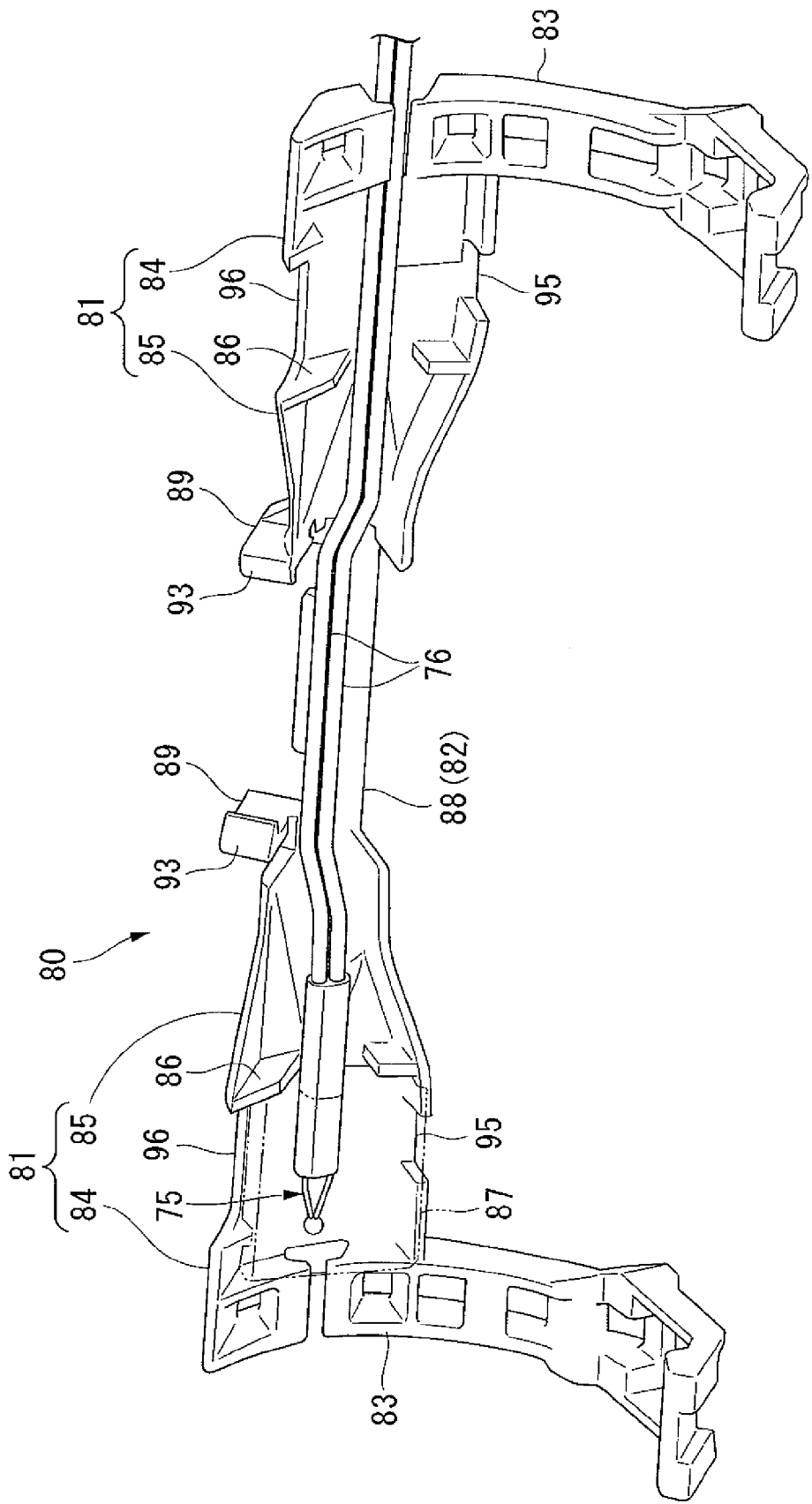
FIG. 8 is a perspective view showing the sensor cover as seen from the inner side.

As is also depicted in FIG. 8, the sensor cover 80 has cover bodies (i.e., covering devices) 81 that are provided on both sides in the axial direction so as to span over the spacer 33 and that covers the temperature sensor 75 and the wires 76, a joint portion 82 that is provided between the two cover bodies 81 and is engaged with the spacer 33, and leg portions 83 that match the shape of the battery outer circumference on outer sides in the axial direction of the respective cover bodies 81.

Each cover body 81 is formed by a flat cover portion 84 that extends along the battery outer circumference on outer sides in the axial direction of the cover body 81, and an extending portion 85 that tapers inwards from an inner side end of the cover 84 towards the inner side in the axial direction.

The cover portions 84 are formed in a rectangular shape when seen in frontal view, and a flat space that opens onto the battery 31 side is formed on an inner side thereof. The temperature sensor 75 and the wires 76 are housed in this flat space.

Moreover, the extending portions 85 extend such that the width of the cover portions 84 in the battery circumferential direction becomes narrower, while the thickness thereof in the battery radial direction increases, and a hollow semicircular cross-sectional configuration is formed at inner side end portions in the axial direction thereof. Note that partition walls 86 that are notched to allow the wires 76 to pass therethrough are provided on inner sides of the cover bodies 81 and between the cover portions 84 and the extending portions 85 (see FIG. 8).

Here, a cushion material (i.e., a sensor protection device) 87 that is formed, for example, from a urethane foam material or the like is adhered to an inner side of the cover portion 84 of the cover body 81 that is located on the side that the temperature sensor 75 (see FIG. 8). When the sensor cover 80 is mounted on the battery 31, the cushion material 87 presses the temperature sensor 75 towards the battery 31 side so that the temperature sensor 75 is tightly pressed against the battery outer circumference and is held under pressure by the sensor cover 80.

The joint portion 82 is formed by a spanning portion 88 that extends between portions adjacent to apex portions, which have a semicircular cross section, of end portions on the inner side in the axial direction of the two extending portions 85, and by upright walls 89 that extend upright following the side end portions of the spacer 33 at inner side end portions in the axial direction of each extending portion 85.

The spanning portion 88 is formed in an elongated plate shape that extends in the battery axial direction. When the sensor cover 80 is mounted on the battery 31, the spanning portion 88 is placed substantially in parallel with side end portions of the spacer 33 and also adjacent thereto, and in this state, covers from the side the wire placement groove 47 through which the wires 76 are passed.

Figure 9:
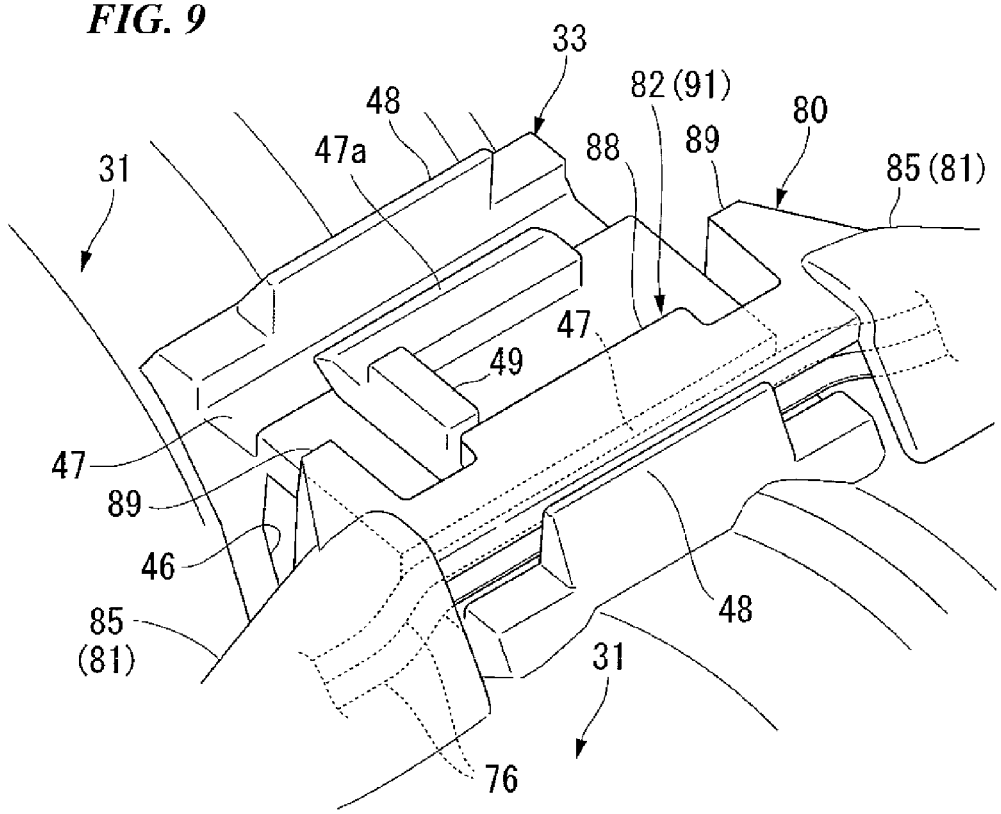
FIG. 9 is a perspective view showing an engaging portion where the sensor cover engages with a battery module.

As is also depicted in FIG. 9, upright walls 48 that extend upright towards the outer side in the horizontal direction are provided on outer sides in the vertical direction of each wire placement groove 47 at side end portions of the spacer 33. One side edge of the spanning portion 88 butts against the surface on the inner side in the vertical direction of that upright wall 48, from among these two upright walls 48, that is located on the side where the temperature sensor 75 is installed. Note that a holding claw 47a that protrudes towards the outer side in the vertical direction in order to prevent the wires 76 from coming free from the inside of the wire placement groove 47 is provided on an inner side in the vertical direction of each wire placement groove 47.

Moreover, a center upright wall 49 that extends upright towards the outer side in the horizontal direction is provided at a position between the two wire placement grooves 47 in the side end portion of the spacer 33 that is also offset towards the battery end side. In contrast to the one side edge of the spanning portion 88, the other side edge thereof butts against the surface on the outer side in the vertical direction of the center wall 49 on the side where the temperature sensor 75 is installed.

As a result, the spanning portion 88 is sandwiched between the upright walls 48 and 49, and is engaged with side end portions of the spacer 33. Accordingly, movement of the sensor cover 80 in the vertical direction and in a rotation direction around the battery axis is restricted. Namely, a rotation direction movement restricting portion (i.e., a second movement-restricting device) 91 that restricts movement of the sensor cover 80 in the rotation direction is formed by the spanning portion 88 (i.e., the joint portion 82) and the upright walls 48 and 49 (i.e., the spacer 33).

Figure 10:
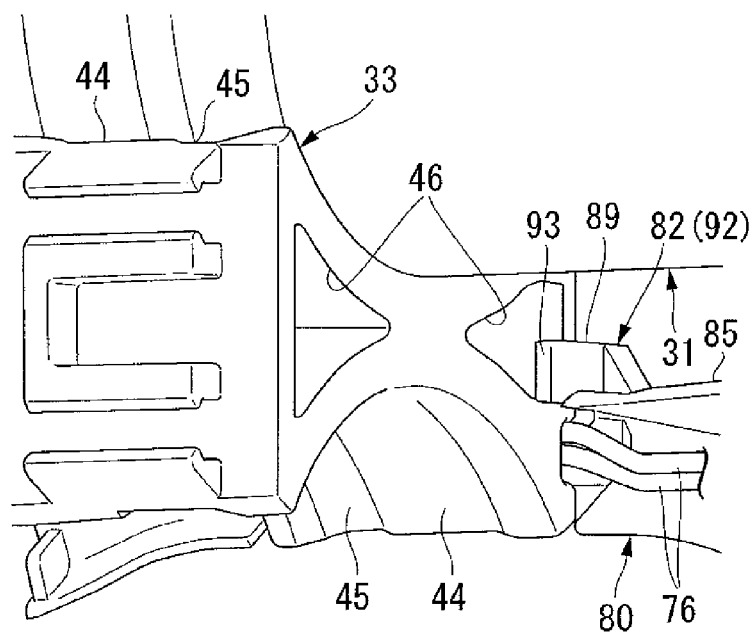
FIG. 10 is a perspective view showing another engaging portion where the sensor cover engages with a holder.

As is also shown in FIG. 10, surfaces on the inner side in the axial direction of the two upright walls 89 of the joint portion 82 butt against the surface on the outer side in the axial direction of the spacer 33. Accordingly, the two upright walls 89 sandwich the spacer 33 so as to become engaged with the spacer 33, which results in movement of the sensor cover 80 in the battery axial direction being restricted. Namely, an axial direction movement restricting portion (i.e., a first movement-restricting device) 92 that restricts movement of the sensor cover 80 in the axial direction is formed by the two upright walls 89 (i.e., the joint portion 82) and the spacer 33.

Engaging claws 93 that protrude towards the inner side in the axial direction are provided at end portions on the inner side in the horizontal direction of the two wall portions 89. As a result of these respective engaging claws 93 engaging with the hollowed out holes 46 in the spacer 33, the joint portion 82 (i.e., an intermediate portion of the sensor cover 80) is engaged with and fixed in the spacer 33.

As is shown in FIG. 6 and FIG. 8, the respective leg portions 83 have a circular arc shape that follows the battery circumferential direction, and one side thereof is connected to the outer side in the axial direction of the respective cover bodies 81. The leg portions 83 extend from this side along the outer circumference on the outer side in the horizontal direction of the battery 31.

When inner circumferences of these respective leg portions 83 are matched to the shape of the battery outer circumference, they are fastened to the battery 31 by tying bands 94 that are wound around the outer circumferences thereof. As a result, both end portions of the sensor cover 80, which is elongated in the axial direction, are firmly fixed to the battery 31. Note that, in the same way as in the partition walls 86, a notch for the wires 76 to pass through is provided in each leg portion 83 in a position adjacent to the cover body 81.

Figure 11:
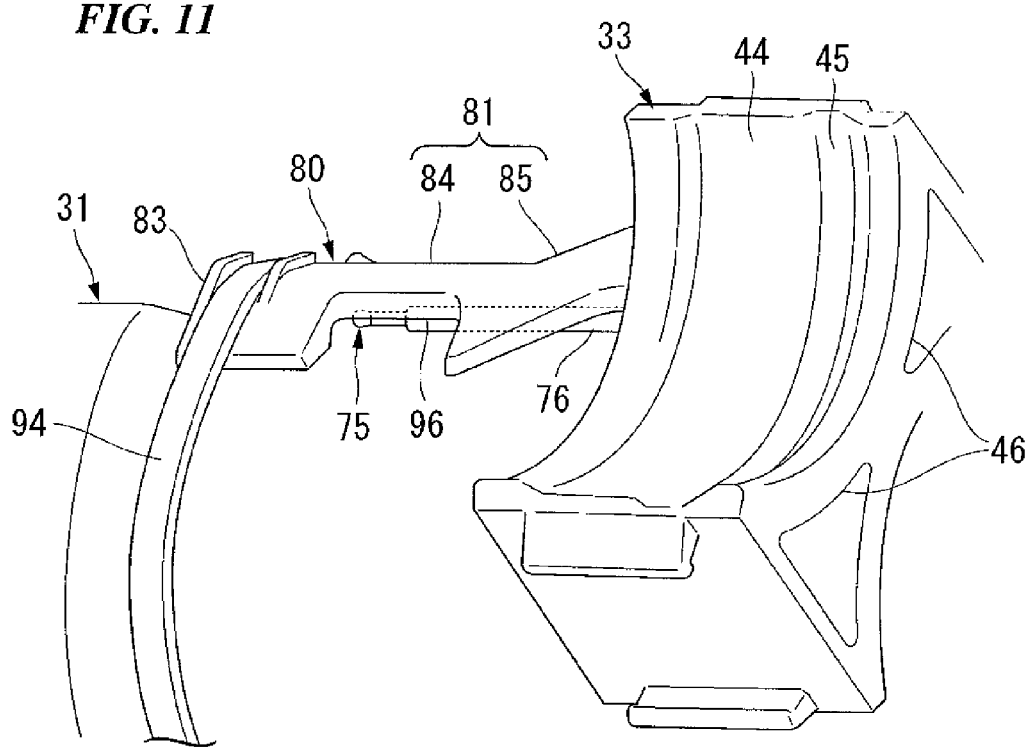
FIG. 11 is a perspective view showing an air communication opening in the sensor cover.
Figure 12:
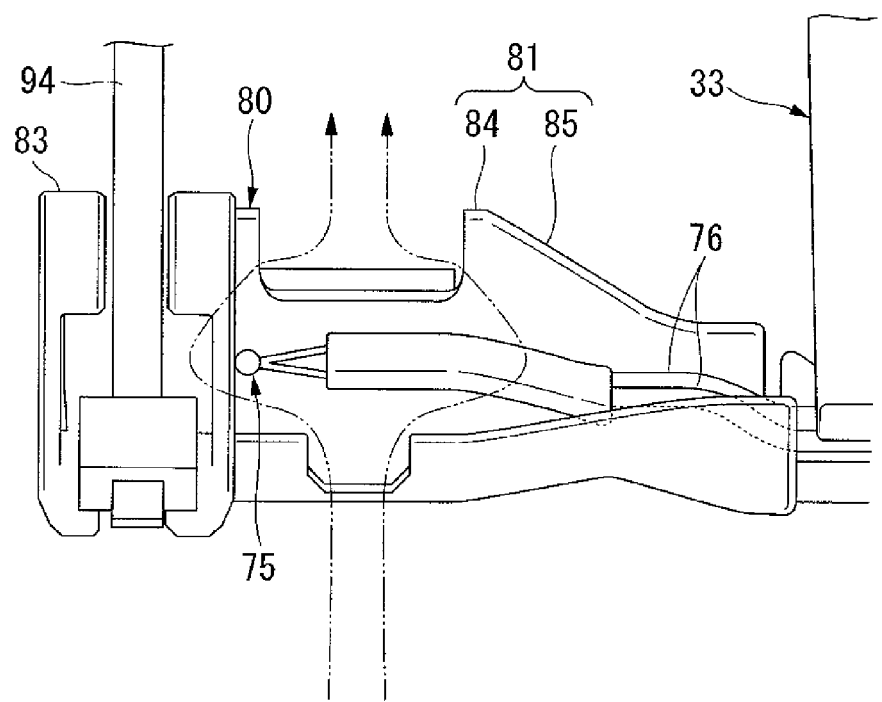
FIG. 12 is a plan view showing a portion where the opening is formed as seen from the inner side.

As can also be seen in FIG. 11 and FIG. 12, openings 95 and 96 are formed in both sides in the battery circumferential direction in the cover portion 84 of each cover body 81 by cutting out a portion thereof. Air is able to pass between the interior and exterior of the cover body 81 through these openings 95 and 96. Namely, air can be circulated inside and outside the cover body 81 while battery-cooling air is prevented by the cover body 81 from directly blowing against the temperature sensor 75. The size of the openings 95 and 96 is different, and the opening 95 which is the smaller of the two is located on the upstream side of the battery-cooling air, while the larger opening 96 is located on the downstream side. Note that the arrows shown as chain lines in FIG. 12 show the flow of the battery-cooling air.

As described above, the temperature sensor mounting structure of the above described embodiment is applied to the battery module 31A in which the single cells 32 are connected together in series, and is provided with the temperature sensor 75 that detects the temperature of the battery module 31A the cover body 81 that covers the temperature sensor 75, and the movement-restricting device that is removably engaged with the battery module 31A in order to restrict the movement of the cover body 81.

Here, the movement-restricting device is provided with the axial direction movement-restricting portion 92 that restricts movement of the cover body 81 in the battery axial direction, and with the rotation direction movement-restricting portion 91 that restricts movement of the cover body 81 in a rotation direction around the battery axis.

According to the above-described structure, compared with when an adhesive agent or tape or a heat shrinkable tube is used to affix the temperature sensor 75 to the battery module 31A, the positioning of the temperature sensor 75 on the battery module 31A can be performed easily and accurately via the cover body 81.

Moreover, as a result of the temperature sensor 75 being covered by the cover body 81, any effects from battery-cooling air are suppressed and the temperature measurement accuracy can be improved.

Furthermore, when carrying out maintenance such as replacing the temperature sensor 75, this can also be performed easily.

Moreover, in the above-described temperature sensor mounting structure, by providing the cushion material 87 on the inner side of the cover body 81, improved protection is provided for the temperature sensor 75 by the buffer action of the cushion material 87. In addition, the temperature sensor 75 is pushed by the elastic force of the cushion material 87 towards the battery module 31A side and is firmly fixed thereto, thereby improving the temperature measurement accuracy.

Furthermore, in the above-mentioned temperature sensor mounting structure, because the cover body 81 is provided with the openings 95 and 96 that allow air to pass between the interior and exterior thereof, air can be circulated inside and outside the cover body 81 while battery-cooling air is prevented from directly blowing against the temperature sensor 75. As a result, not only is the temperature measurement accuracy improved, but also temperature increases inside the cover body 81 are suppressed and an excellent battery cooling performance is ensured.

Moreover, in the above-described temperature sensor mounting structure, because the movement-restricting device (i.e., the axial direction movement restricting portion 92 and the rotation direction movement restricting portion 91) is formed using the spacer 33 which is a structural component of the battery module 31A, the structure of the movement-restricting device is simplified and a reduction in size and weight can be achieved.

Second Embodiment

A second embodiment of the present invention will now be described.

This embodiment differs from the first embodiment in that, instead of the sensor cover 80, a sensor cover 100 is used that is mounted so as to sandwich the battery 31. Portions that are the same as those in the first embodiment are given the same descriptive symbols and a description thereof is omitted.

Figure 13:
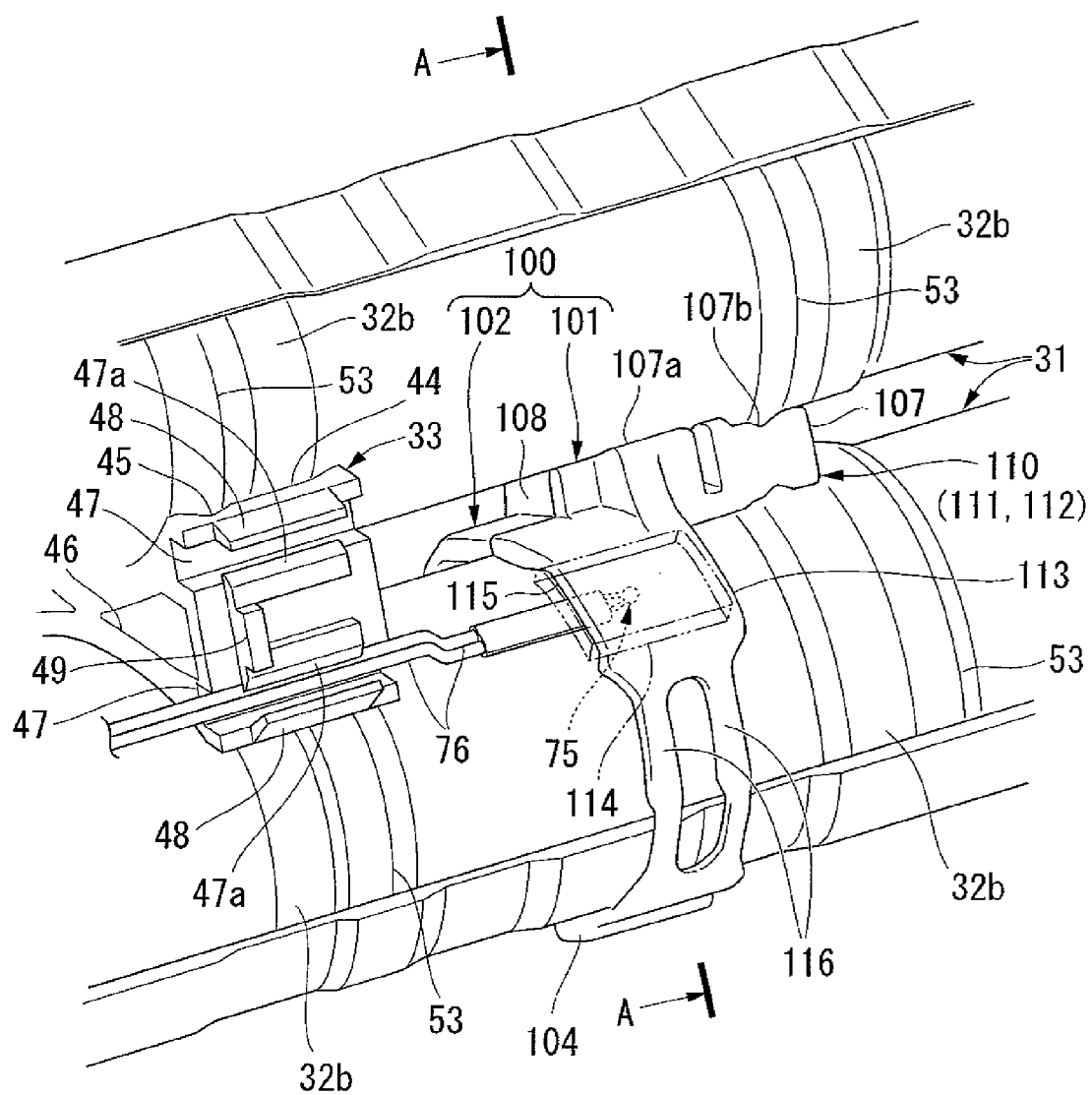
FIG. 13 is a perspective view showing a temperature sensor mounting portion in a second embodiment of the present invention.
Figure 14:
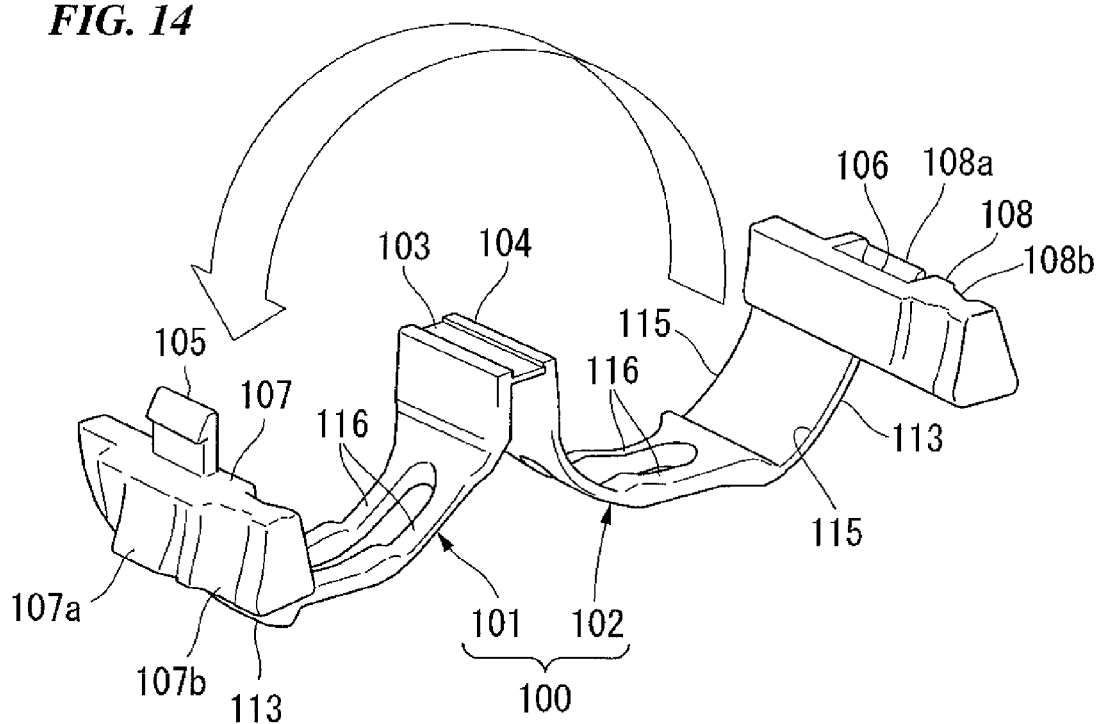
FIG. 14 is a perspective view showing a sensor cover of the temperature sensor mounting portion being opened up.
Figure 15:
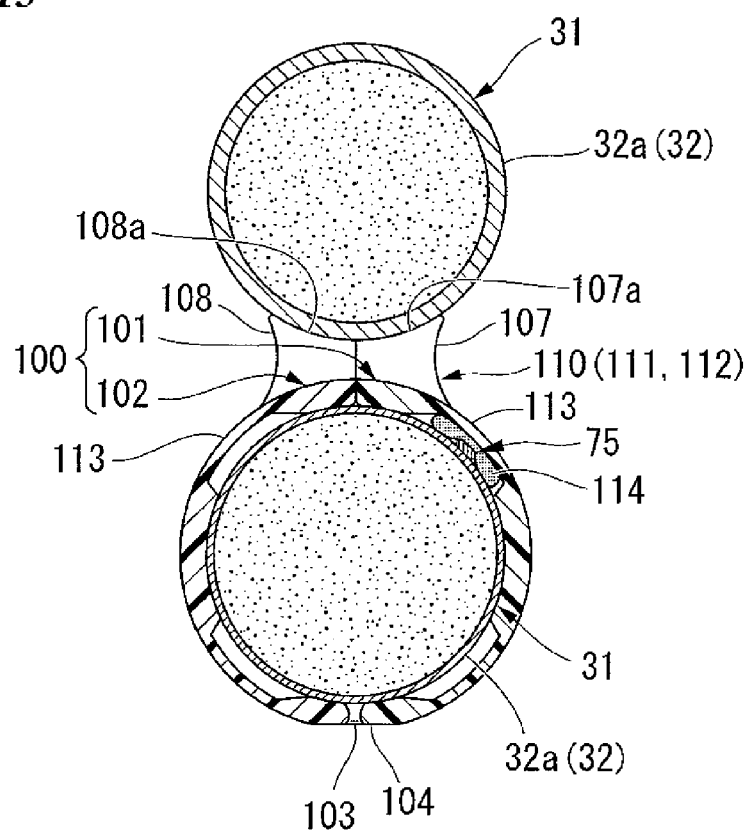
FIG. 15 is a cross-sectional view taken along the line A-A in FIG. 13.

The sensor cover 100 shown in FIGS. 13, 14, and 15 is formed from a non-conductive resin in the same way as the sensor cover 80, and is formed by a pair of semicircular bodies 101 and 102 that match the shape of the outer circumference of the battery 31. End portions on one side in the circumferential direction of each of these semicircular bodies 101 and 102 form a hinge portion 104 as a result of their being connected, for example, via a flexible thin portion 103 (or via a hinge shaft).

When this hinge portion 104 is placed on the outer side in the vertical direction of the battery 31, the semicircular bodies 101 and 102 are pivoted so as to sandwich the battery 31. An engaging clip 105 and an engaging portion 106 that are provided at end portions on the other side in the circumferential direction of the semicircular bodies 101 and 102 are then engaged with each other, resulting in the sensor cover 100 becoming mounted on the battery 31. Note that if a structure is employed in which the sensor cover 100 is mounted on the battery 31 by joining the semicircular bodies 101 and 102 together not by a clip, but by using a band such as the tying band 94, then this structure can be shared by battery modules having different diameters.

Figure 16:
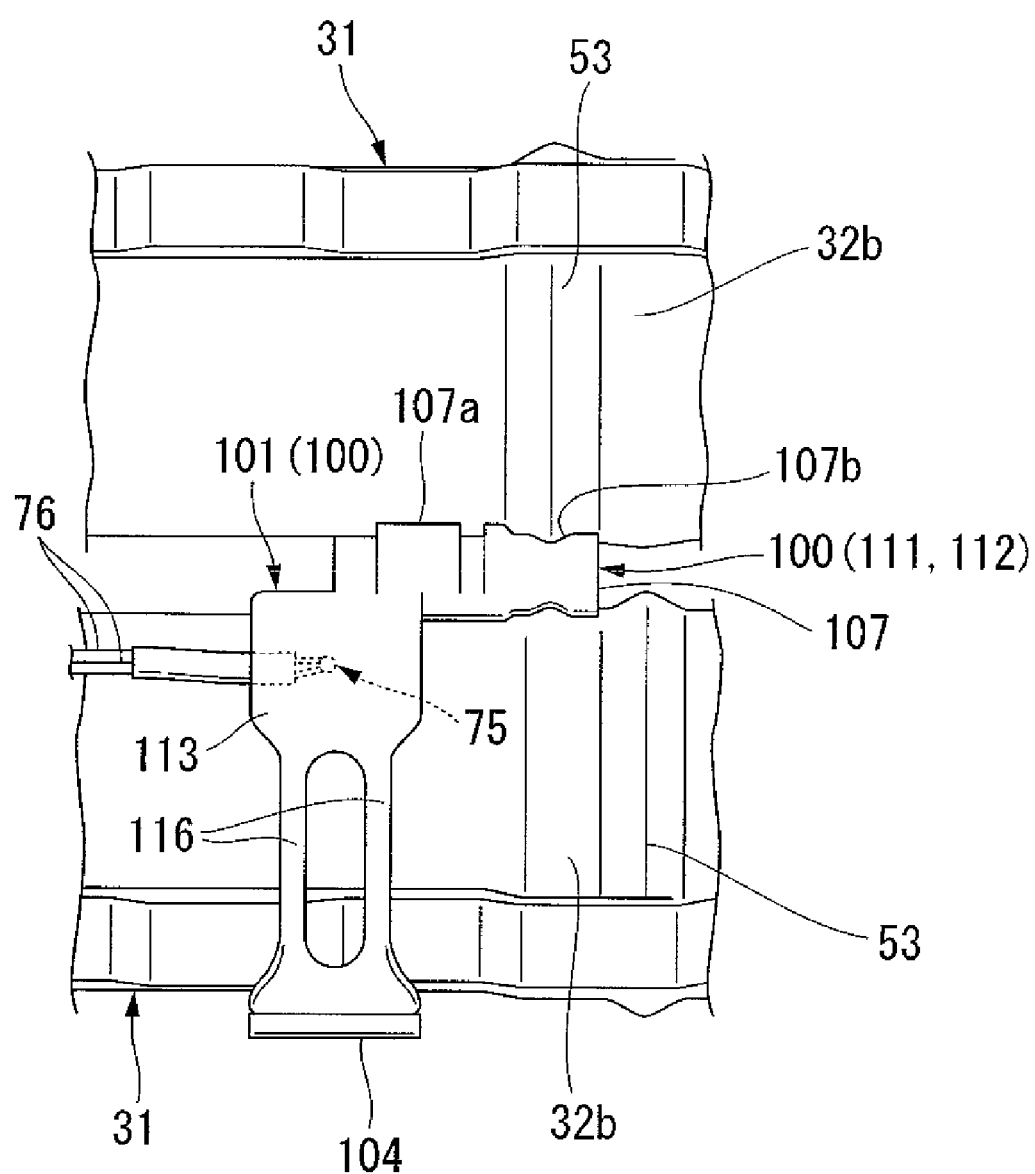
FIG. 16 is a front view showing the temperature sensor mounting portion.

As is also shown in FIG. 16, offset portions 107 and 108 that are offset towards the inner side in the battery axial direction relative to the band-shaped body that extends in the battery circumferential direction, and whose thickness in the vertical direction increases towards the other battery 31 side are provided on an other side in the circumferential direction of the respective semicircular bodies 107 and 108.

Matching portions 107a and 108a which are shaped like circular arcs when viewed from the axial direction that match the shape of the outer circumference of the respective batteries 31, and groove portions 107b and 108b that are formed on the matching portions 107a and 108a and match the shape of the circular protrusions 53 of the respective batteries 31 are provided at both sides in the vertical direction of the respective offset portions 107 and 108.

As a result of these respective offset portions 107 and 108 being connected to each other between the two batteries 31, when the sensor cover 100 is mounted on the battery 31a cover spacer 110 is constructed that functions in the same way as the spacers 33.

As a result of the cover spacer 110 being sandwiched between the two batteries 31, the respective matching portions 107a and 108a that span across a position immediately adjacent to the two batteries 31 are matched to the shape of the battery outer circumference, and the respective groove portions 107b and 108b are matched with the circular protrusions 53. Accordingly, movement of the cover spacer 110 (i.e., the sensor cover 100) in a rotation direction around the battery axis is restricted, and movement thereof in the battery axial direction is also restricted.

Namely, a rotation direction movement restricting portion (i.e., a second movement-restricting device) 111 of the sensor cover 100 and an axial direction movement restricting portion (i.e., a first movement-restricting device) 112 of the sensor cover 100 are constructed by the cover spacer 110 and the outer tubes 32a of the single cells 32.

Portions on the outer side on the horizontal direction beyond the offset portions 107 and 108 of the respective semicircular bodies 101 and 102 (i.e., portions corresponding to the temperature sensor 75) are formed as cover bodies (i.e., covering devices) 113 in which a hollowed out portion is created in an inner circumference thereof so as to form a gap between themselves and the battery outer circumference. Of these cover bodies 113, the temperature sensor 75 is housed inside the cover body 113 on the side where the temperature sensor 75 is located.

Cushion material 114 (i.e., a sensor protection device) is adhered to the inner side of the cover body 113. The cushion material 114 presses the temperature sensor 75 tightly against the battery 31 side and holds it there under pressure. Moreover, both sides in the axial direction of the respective cover bodies 113 are formed as openings 115 that are open in order to allow air to pass between the interior and exterior thereof. Note that portions between the cover bodies and the hinge portion 104 in the respective semicircular bodies 101 and 102 are formed as a pair of elastic pieces 116 whose width is narrower in the battery axial direction.

In the above described temperature sensor mounting structure according to the second embodiment as well, it is possible to easily and accurately position the temperature sensor 75, and it is possible to improve the temperature measurement accuracy while ensuring an excellent battery cooling performance. Maintenance of the temperature sensor 75 can also be easily carried out, the movement restricting structure of the temperature sensor 75 can be simplified, and the protection of the temperature sensor 75 can be improved.

Third Embodiment

Next, a third embodiment of the present invention will be described.

In this embodiment, a structure is employed in which a harness 128 (corresponding to the wires 76) of the temperature sensor 75 that is mounted on a battery module 121A is pulled out as far as an endplate 122 of this battery module 121A, and the harness 128 is held by a harness-fixing device that is provided on this endplate 122. Note that portions that are the same as those in the above-described embodiments are given the same descriptive symbols and a description thereof is omitted.

Figure 17:
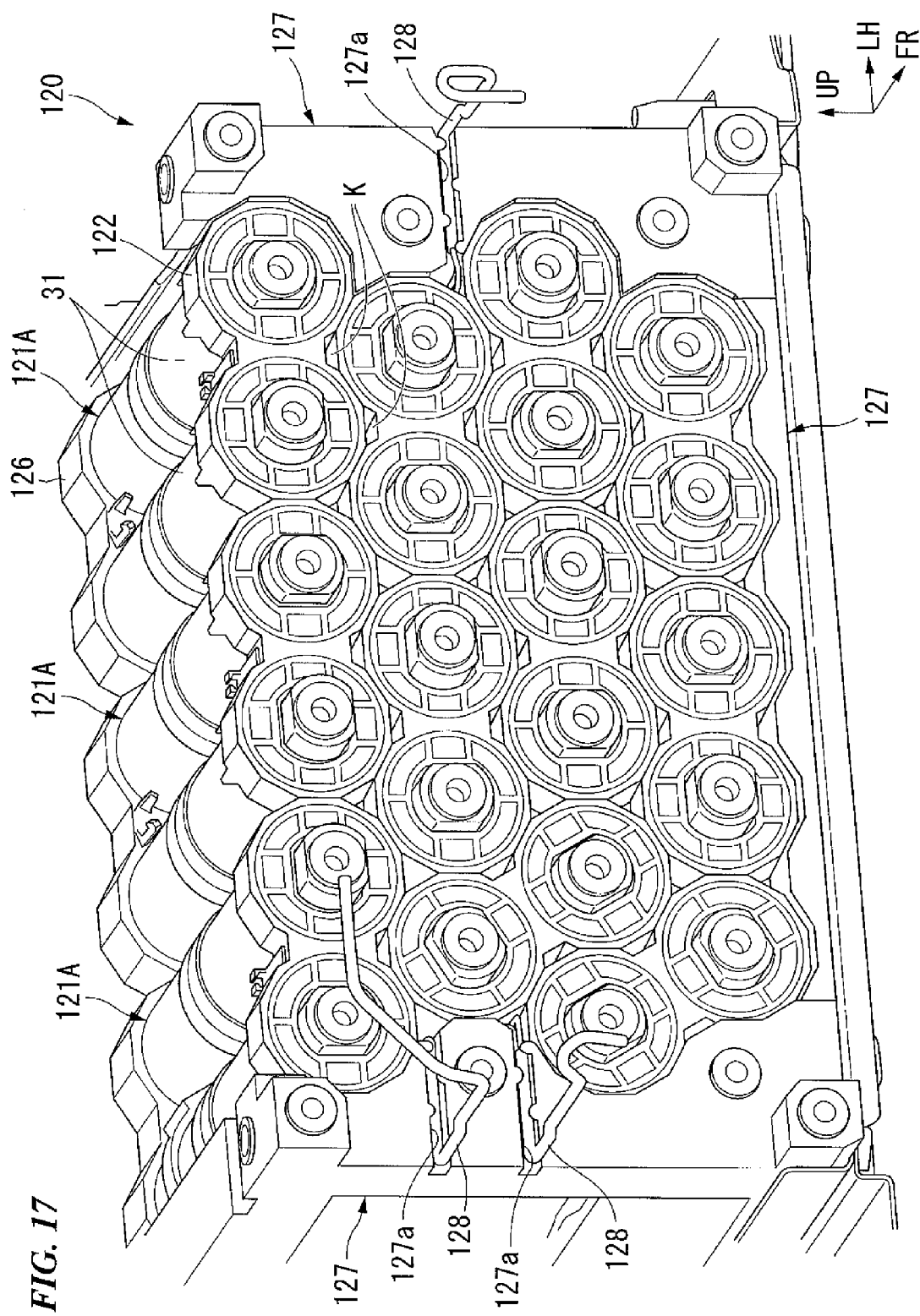
FIG. 17 is a perspective view showing a high-voltage battery in a third embodiment of the present invention.
Figure 18:
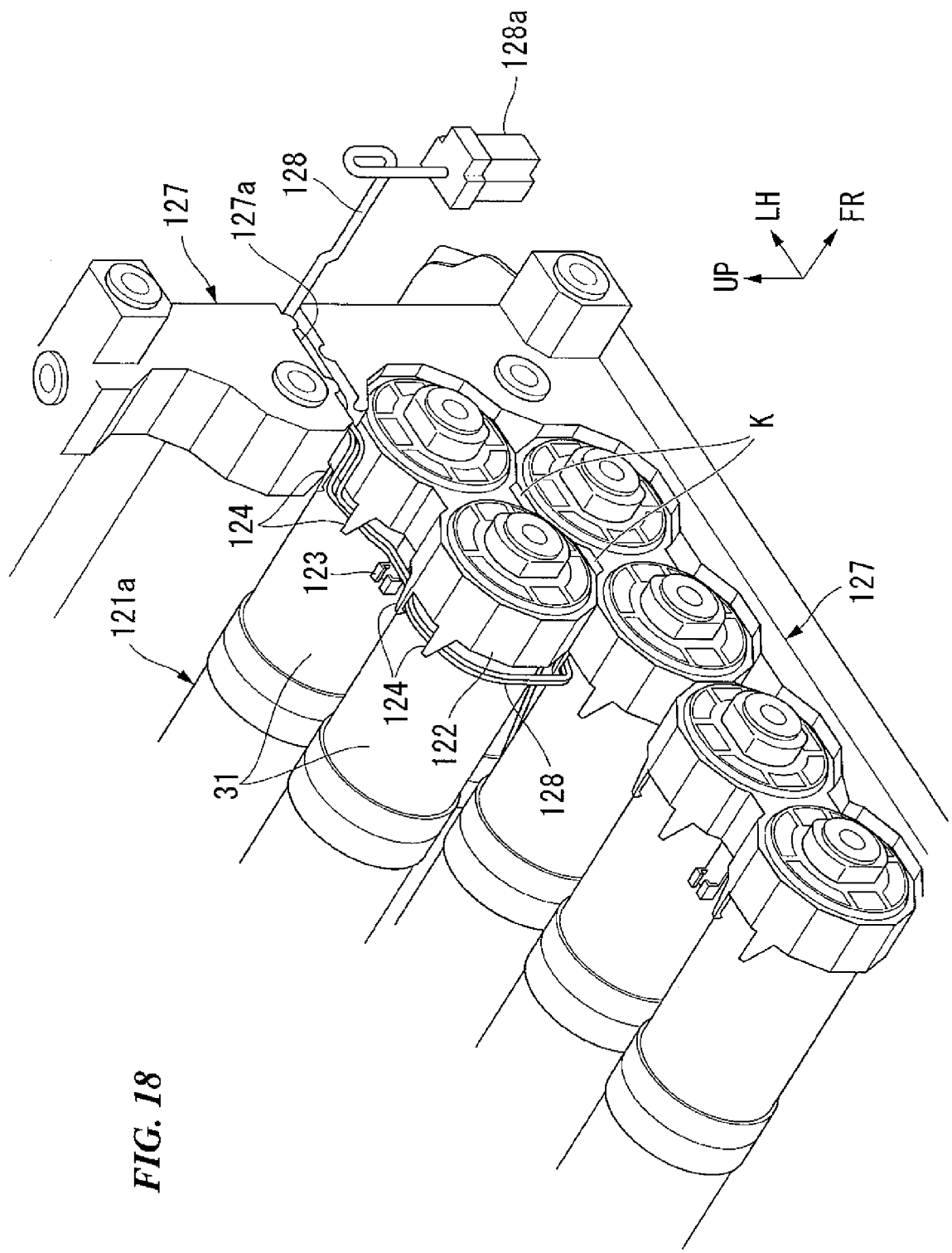
FIG. 18 is a perspective view showing a partially exploded view of the high-voltage battery shown in FIG. 17.

As is shown in FIG. 17 and FIG. 18, in the battery module 121A of this embodiment, a pair of batteries 31 are arranged next to each other so as to have alternate positive and negative poles, and the end portions thereof are connected together via an endplate 122. At this time, a predetermined gap is formed between the two batteries 31. These battery modules 121A are arranged in a plurality of parallel rows, and are stacked, for example, in four vertical levels. One end portion thereof is appropriately wired using a bus bar plate (not shown), and all of the battery modules 121A are connected in series so as to form a high-voltage battery 120. Hereinafter, the arrow FR in the drawings refers to the front, the arrow UP refers to up, the arrow LH refers to the left.

Each endplate 122 is formed by joining together polygon shapes that are substantially coaxial with the batteries 31 (i.e., the single cells 32) so as to form a FIG. 8 when viewed in the battery axial direction. When stacking the battery modules 121A, each battery 31 is arranged in a zigzag pattern when viewed in the axial direction of the battery modules 121A. At this time, each endplate 122 is in partial surface contact with adjacent endplates 122, and in this state, is held via a holder component 127 from both the top and bottom and the left and right. As a result, each battery module 121A (i.e., battery 31) is integrally held with a predetermined gap in between each.

Moreover, a gap K that is shaped like a triangle when viewed in the battery axial direction is formed between the recessed portion of the endplate 122 that is located between the two batteries 31 and the endplate 122 that is positioned either above or below this recessed portion. Note that a spacer 126 that is held between two batteries 31 and maintains the gap between them, and that also functions as a positioning device when the battery modules 121A are stacked is provided in an end portion in the longitudinal direction of each battery modules 121A.

An example of the wiring of the harness 128 that extends from the temperature sensor 75 will now be described with reference made to FIG. 18. The harness 128 firstly extends between the two batteries 31 of a battery module 121A near the endplate 122 and then bends upwards directly behind the endplate 122. It then extends upwards so as to detour around the battery module 121A on the next level up, and then extends towards the outer side in the left-right direction along the top surface of this upper level battery module 121A. It then bends towards the front at a top end position of the battery 31 on the outer side in the left-right direction of this battery module 121A, and passes over the endplate 122 to the front of the endplate 122 (i.e., to the exterior of the high-voltage battery 120). The harness 128 that passed over the endplate 122 is positioned inside the gap K.

The harness 128 which is wired from the rear of the endplate 122 to the front thereof passes inside a wiring groove 127a that is formed in a front surface portion of the holder component 127 on the outer side in the left-right direction, and thereafter is guided to the exterior of the high-voltage battery 120 and is led along to a predetermined wire connection position. A connector 128a at the distal end thereof is then connected to the harness on the vehicle side.

Here, an inter-battery holding portion (i.e., a first fixing device) 123 and inner protruding portions (i.e., second fixing devices) 124 that serve as harness-fixing devices that fix the harness 128 on its wring path are provided on a top portion of each endplate 122.

The inter-battery holding portion 123 is provided so as to protrude in a rearward direction from a position located between the batteries 31 at the rear of the endplate 122 (i.e., the inner side in the battery longitudinal direction), and has a pair of left-right claw portions in order to hold the harness 128 in a state of being substantially parallel with the battery longitudinal direction.

Moreover, the inner protruding portions 124 are provided, for example, as a pair on the left and right such that they protrude in a rearward direction from a position located on a top end side of the outer circumference of the battery 31 (i.e., the single cell 32) at the rear of the endplate 122. These inner protruding portions 124 are formed as triangular shapes that are elongated in the direction in which they protrude. Note that the inter-battery holding portion 123 and inner protruding portions 124 are provided symmetrically at the top and bottom of each endplate 122.

The inner protruding portions 124 press the harness 128 against the outer circumference of the batteries 31 so as to hold it. As is described above, when the harness 128 is bent immediately behind the endplate 122, the inner protruding portions 124 hold the bend portion of the harness 128. In addition, when the harness 128 is wired so as to follow the top and bottom surfaces of a battery module 121A, the inner protruding portions 124 hold the harness 128 such that it follows the outer circumference of the battery 31. As a result, the harness 128 is fixed on a predetermined wiring path.

Figure 19:
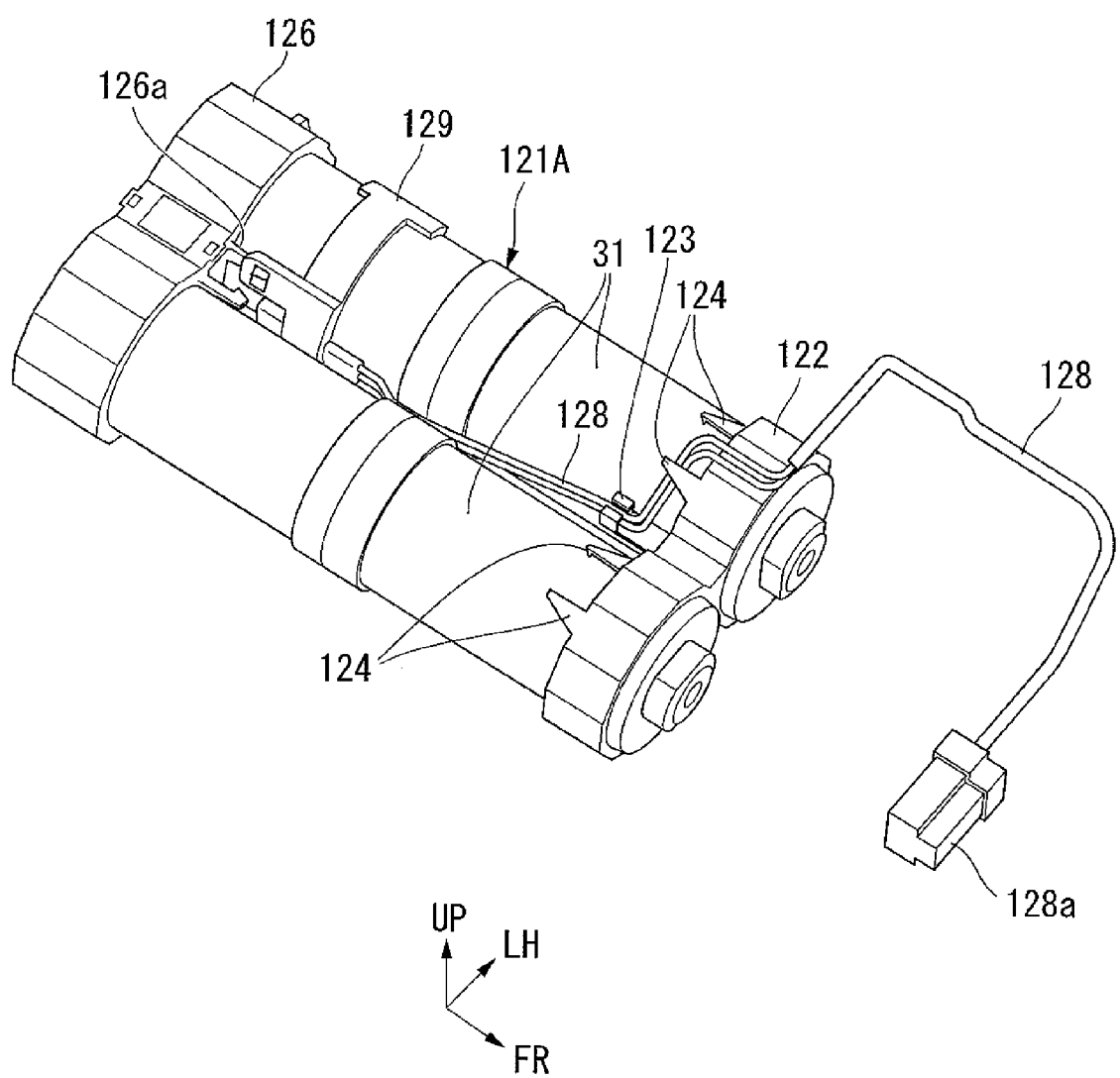
FIG. 19 is a perspective view showing a battery module that constitutes the high-voltage battery shown in FIG. 17.

FIG. 19 shows another example of a way to wire the harness 128. As is shown in FIG. 19, the harness 128 firstly extends between the batteries 31 of the battery module 121A towards the endplate 122, and is held by the inter-battery holding portion 123. It thereafter is bent towards the outer side in the left-right direction immediately behind the endplate 122, extends for a short distance towards the outer side in the left-right direction along the outer circumference of the battery 31, and is then held by one inner protruding portion 124. It is then bent towards the front and passes over the endplate 122 to the front thereof. Thereafter, the wiring of the harness 128 is the same as in the description given above.

Note that the symbol 129 in the drawings indicates a sensor cover that is mounted so as to sandwich the battery 31 in the same way as the sensor cover 100, however, the sensor cover 129 is different from the sensor cover 100 mainly in the fact that, due to it being adjacent to the spacers 126, it no longer has the function of acting as a spacer between two batteries 31, and in the fact that the position of the sensor cover 129 in the battery circumferential direction and axial direction is restricted by the sensor cover 129 engaging with a positioning portion 126a that extends from the spacer 126.

As described above, in the battery module structure of the third embodiment, the harness 128 that is mounted on the battery module 121A is fixed to a harness-fixing device that is provided on the endplate 122 of the battery module 121A.

According to this structure, as a result of the harness 128 being fixed in each battery module 128, the wiring thereof is not complicated, and the wiring operation is easily performed even from the battery module 121A end side. Moreover, replacement can also be performed in battery module 121A units. Namely, it is possible to improve the workability of attaching and removing the harness 128, and it is possible to prevent the harness 128 from becoming caught up when a plurality of battery modules 121A are being assembled. In addition, maintenance can also be easily performed in battery module 121A units.

Moreover, as a result of the inner protruding portions 124 of the endplate 122 being used to form the harness-fixing device, the structure of the harness-fixing device can be simplified, and a reduction in the cost of the battery modules 121A can be achieved.

Here, by providing the inner protruding portions 124 on the inner side in the battery longitudinal direction of the endplates 122, a portion of the harness 128 that is held by the inner protruding portion 124 does not face the battery module 121A end, and it is not necessary to pay such close attention to ensure that the harness 128 does not become caught up and the like so that there is an improvement in workability when laying the harness 128.

Furthermore, because the harness-fixing device is formed having the inter-battery holding portion 123 that is located between the batteries 31, and the inner protruding portions 124 that are arranged along the outer circumference of the batteries 31, firstly, the harness 128 is held by the inter-battery holding portion 123 and is fixed between the batteries 31, and thereafter this harness 128 can be laid along the outer circumference of the battery 31 and led out at a desired position while it is being held by the inner protruding portions 124. As a result, the wiring of the harness 128 can be laid reliably and freely.

In addition, when the high-voltage battery 120 is constructed by assembling together a plurality of battery modules 121A, as a result of the harness 128 being guided to the exterior of the high-voltage battery 120 via the harness-fixing devices of a plurality of endplates 122, even it for example, the harness 128 that is mounted on the battery module 121A that is positioned on a center side of the high-voltage battery 120 is guided to the exterior, it is still possible after the harness 128 wired via the harness-fixing devices of a plurality of endplates 122 to guide it to a desired position. As a result, the shape of the harness 128 can be properly organized and the wire connection workability can be improved.

Fourth Embodiment

Next, a fourth embodiment of the present invention will be described.

In this embodiment, the form of the harness-fixing device that is provided in the endplate 122 of the battery module 121A is different from that of the third embodiment, and, in conjunction with this, the wiring path of the harness 128 is different. Note that portions that are the same as those in the third embodiment are given the same descriptive symbols and a description thereof is omitted.

Figure 20:
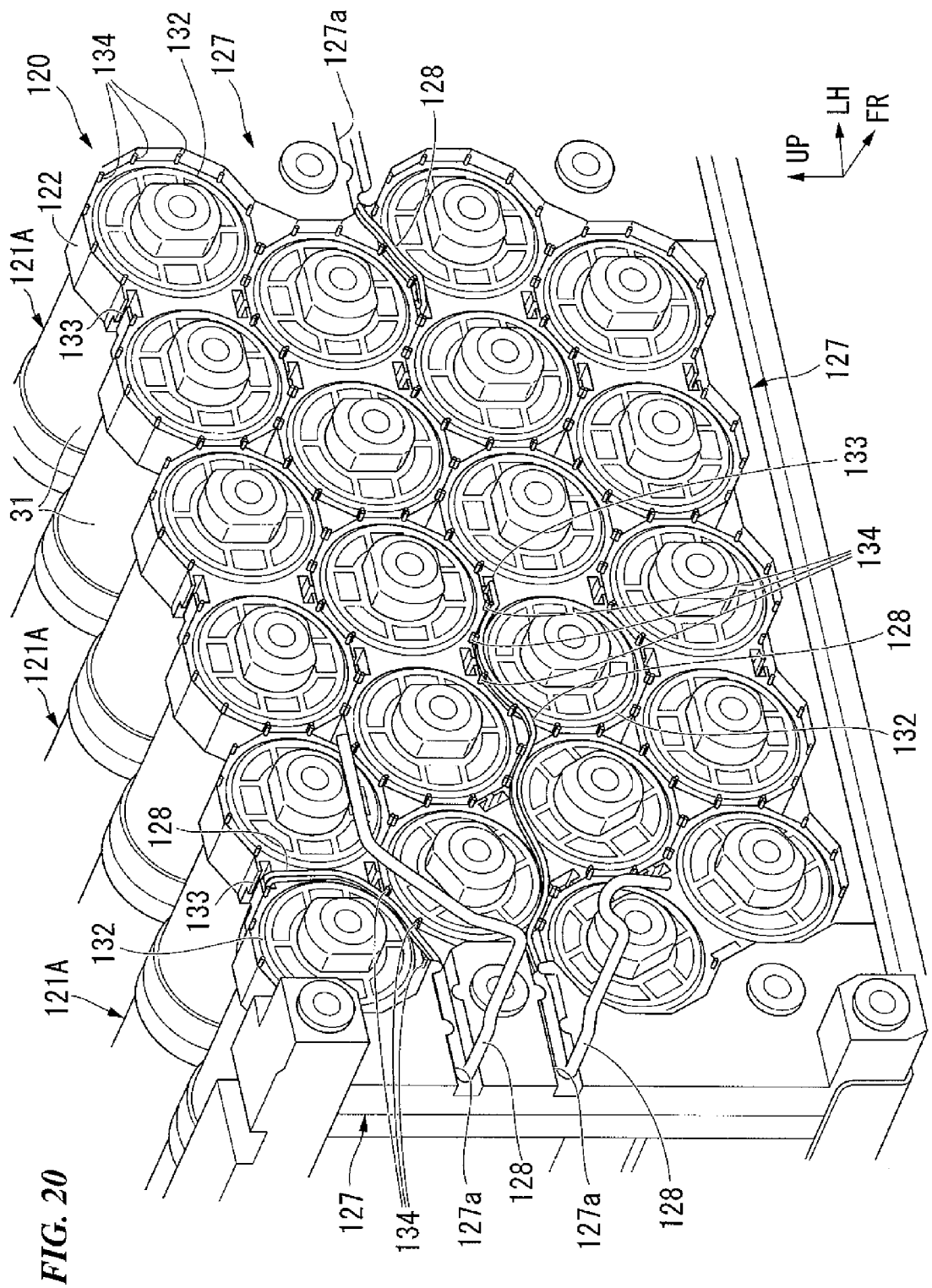
FIG. 20 is a perspective view showing a high-voltage battery in a fourth embodiment of the present invention.
Figure 21:
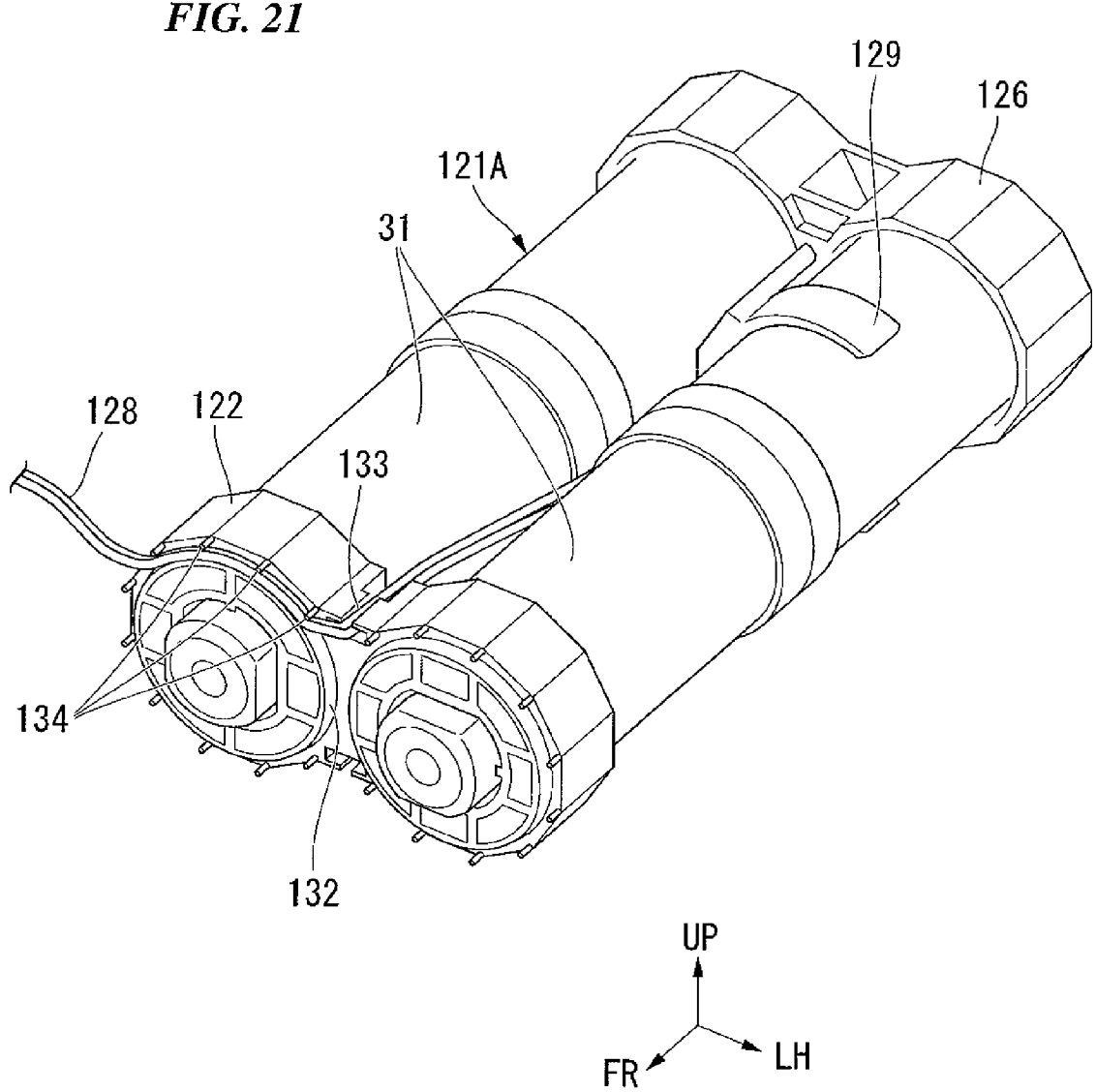
FIG. 21 is a perspective view showing a battery module that constitutes the high-voltage battery shown in FIG. 18.

As is shown in FIG. 20 and FIG. 21, the harness 128 firstly extends between the two batteries 31 of the battery modules 121A to the endplate 122 side and then passes to the front of this endplate 122 (i.e., to the outside of the high-voltage battery 120). It is then bent directly in front of the endplate 122, and then curves at the front surface side of the endplate 122 so as to follow the outer circumference of a toroidal step portion 132 that is provided substantially coaxially with the battery 31. It then extends to the outside in the left-right direction.

After this harness 128 passed over the top surface side of the endplate 122 as far as the front thereof and is bent, for example, downwards, it curves so as to follow the outer circumference of the bottom portion of the step portion 132 and then extends to the outer side in the left-right direction. Thereafter, it passes inside the wiring groove 127a of the holder component 127 and is guided to the outside of the high-voltage battery 120 (see FIG. 20).

Moreover, in the harness 128 that is mounted on the battery module 121A that is positioned on the center side of the high-voltage battery 120, after the harness 128 passed over the top surface side of the endplate 122 as far as the front thereof, it curves, for example, so as to follow the outer circumference of the top portion of the step portion 132. It then extends further to the outer side in the left-right direction so as to follow the step portion 132 of the endplate 122 of the battery module 121A that is placed on the outer side in the left-right direction. Thereafter, it passes inside the wiring groove 127a of the holder component 127 and is guided to the outside of the high-voltage battery 120 (see FIG. 20).

Here, an inter-battery holding portion (i.e., a first fixing device) 133 and outer protruding portions (i.e., second fixing devices) 134 that serve as harness-fixing devices that fix the harness 128 on its wiring path are provided at the top and bottom between the two batteries 31 of each endplate 122, and on the front surface side of outer circumferential portions of the endplate 122.

The inter-battery holding portion 133 is recessed at the front side of the endplate 122 between the two batteries 31, and has a pair of left and right overhang portions in order to hold the harness 128 in a state of being substantially parallel with the battery longitudinal direction. The outer protruding portions 134 are pin shaped and a number of them are provided, for example, equidistantly protruding outwards from the front surface side of the outer circumferential portion of the endplate 122.

The outer protruding portions 134 press the harness 128 against the outer circumference of the step portion 132 so as to hold it. When the harness 128 is bent after passing through the endplate 122 as described above, the outer protruding portions 134 hold the bend portion of the harness 128. In addition, when the harness 128 curves so as to follow the step portion 132, the outer protruding portions 134 hold the harness 128 in this curved state. As a result, the harness 128 is fixed on a predetermined wiring path.

As described above, in the battery module structure of the fourth embodiment as well, in the same way as in the third embodiment it is possible to improve the workability of attaching and removing the harness 128, and it is possible to prevent the harness 128 from becoming caught up when a plurality of battery modules 121A are being assembled. In addition, maintenance can also be easily performed in battery module 121A units. Moreover, the wiring of the harness 128 can be laid reliably and freely, and the wire connection workability can be improved in high-voltage batteries 120 units.

Here, as a result of the outer protruding portions 134 which constitute a portion of the harness-fixing device being provided on the outer side in the battery longitudinal direction of the endplate 122, the task of wiring the harness 128 from the battery module 121A end side (i.e., from outside the high-voltage battery 120) is easier, and the workability when attaching and removing the harness 128 can be further improved.

Note that the present invention is not limited to the above-described embodiments. For example, in the first and second embodiments, structural components (i.e., the spacers 33 and the outer tubes 32a) of the battery module 31A on which the temperature sensor 75 is mounted are used for the movement restricting portions 91, 92, 111, and 112; however, it is also possible for structural components of, for example, an adjacent battery module 31A (namely, one on which the temperature sensor 75 is not mounted) to be used for these.

Moreover, in the third embodiment as well, in the same way as in the fourth embodiment, it is also possible to employ a structure in which the harness 128 is laid so as to go past the endplates 122 of a plurality of battery modules 121A. Here, in the third and fourth embodiments, the type of harness that is fixed to the endplate 122 is not limited to the harness 128 of the temperature sensor 75; other electrical harnesses or else gas discharge tubes and the like that, when a gas such as hydrogen is generated from the battery 31, discharge this gas may also be used. Furthermore, it is also possible in the high-voltage battery 120 for the batteries 31 to be arranged in a lattice configuration when viewed from the axial direction thereof instead of in a zigzag configuration.

According to the present invention, it is possible to easily and accurately position a temperature-measuring device relative to a battery module which is formed by joining together in series a plurality of single cells, and also improve the temperature measurement accuracy. Moreover, maintenance of the temperature measurement device can be easily performed and a simplification of the movement restricting structure thereof can be achieved.

What is claimed is:

1. A temperature sensor mounting structure for a battery module including at least two batteries, each of which is formed by connecting single cells together in series, the temperature sensor mounting structure comprising:
a temperature-measuring device that measures the temperature of at least one of the batteries;
a covering device that covers the temperature-measuring device; and
a spacer disposed between two of said batteries,
wherein said covering device includes a spanning portion and a plurality of upright walls,
wherein said spacer includes a plurality of upright walls,
wherein movement of the covering device in an axial direction of the batteries is restricted by said spacer and said plurality of upright walls of said covering device, and
wherein movement of the covering device in a rotation direction around an axis of one of the batteries is restricted by said spanning portion of said covering device and said plurality of upright walls of said spacer.

2. The temperature sensor mounting structure according to claim 1, wherein the covering device is mounted on the at least one of the plurality of batteries using a clip connector or a band connector.

3. The temperature sensor mounting structure according to claim 1, wherein a sensor protection device is provided on an interior side of the covering device.

4. The temperature sensor mounting structure according to claim 1, wherein the covering device has an opening to allow air to pass between the interior and exterior thereof.

5. A temperature sensor mounting structure for a battery module that is formed by connecting single cells together in series, the temperature sensor mounting structure comprising:
a temperature-measuring device that measures the temperature of the battery module; and
a covering device that covers the temperature-measuring device;
wherein said battery module includes protruding portions formed on an outer circumference of said battery module, and
wherein movement of said covering device is restricted by said protruding portions of said battery module.

6. The temperature sensor mounting structure according to claim 5, wherein movement of said covering device in an axial direction of said battery module is constricted by said protruding portions of the battery module.

7. The temperature sensor mounting structure of claim 6, wherein said covering device includes a groove portion which is fittable to said protruding portions of said battery module.

8. The temperature sensor mounting structure of claim 7, wherein said covering device includes two semicircular portions joined by a hinge portion, said covering device being foldable at said hinge portion to encircle said battery module.

9. A temperature sensor mounting structure for a battery module including a battery formed by connecting single cells together in series and bending the single cells in a U-shape, the temperature sensor mounting structure comprising:

a temperature-measuring device that measures the temperature of at least one of a first part of the battery having the U-shape and a second part of the battery having the U-shape;

a covering device that covers the temperature-measuring device; and a spacer disposed between the first part of the battery having the U-shape and the second part of the battery having the U-shape, wherein said covering device includes a spanning portion and a plurality of upright walls, wherein said spacer includes a plurality of upright walls, wherein movement of the covering device in an axial direction of the battery is restricted by said spacer and said plurality of upright walls of said covering device, and wherein movement of the covering device in a rotation direction around an axis of the first part of the battery having the U-shape or the second part of the battery having the U-shape is restricted by said spanning portion of said covering device and said plurality of upright walls of said spacer.

10. The temperature sensor mounting structure according to claim 9, wherein the covering device is mounted on the at least one of the first part of the battery having the U-shape or the second part of the battery having the U-shape using a clip connector or a band connector.

11. The temperature sensor mounting structure according to claim 9, wherein a sensor protection device is provided on an interior side of the covering device.

12. The temperature sensor mounting structure according to claim 9, wherein the covering device has an opening to allow air to pass between the interior and exterior thereof.

* * * * *